(12) United States Patent
Wu et al.

(10) Patent No.: US 6,314,802 B1
(45) Date of Patent: Nov. 13, 2001

(54) OPTIMAL ENGINE SPEED COMPENSATION METHOD USED IN MISFIRE DETECTION

(75) Inventors: Zhijian James Wu, Rochester Hills; Anson Lee, St. Clair, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/361,837

(22) Filed: Jul. 27, 1999

(51) Int. Cl.$^7$ .................................................. G01M 15/00
(52) U.S. Cl. .......................... 73/117.3; 701/110; 123/436
(58) Field of Search ................... 73/116, 117.2, 73/117.3; 701/110, 111; 123/419, 436

(56) References Cited

U.S. PATENT DOCUMENTS

| | | |
|---|---|---|
| 3,908,366 | 9/1975 | Masaki . |
| 4,179,922 | 12/1979 | Bouverie et al. . |
| 4,186,701 | 2/1980 | Suzuki et al. . |
| 4,271,811 | 6/1981 | Suzuki et al. . |
| 4,308,519 | 12/1981 | Garcea et al. . |
| 4,461,257 | 7/1984 | Hosaka et al. . |
| 4,488,528 | 12/1984 | Morikawa . |
| 4,491,110 | 1/1985 | Bone et al. . |
| 4,532,592 | 7/1985 | Citron et al. . |
| 4,562,818 | 1/1986 | Kohama et al. . |
| 4,606,224 | 8/1986 | Tedeschi et al. . |
| 4,716,874 | 1/1988 | Hilliard et al. . |
| 4,782,692 | 11/1988 | Peden et al. . |
| 4,846,129 | 7/1989 | Noble . |
| 4,862,093 | 8/1989 | Jiewertz . |
| 4,886,029 | 12/1989 | Lill et al. . |
| 4,928,228 | 5/1990 | Fujimoto et al. . |
| 4,930,479 | 6/1990 | Osawa et al. . |
| 4,930,481 | 6/1990 | Fujimoto et al. . |
| 4,932,379 | 6/1990 | Tang et al. . |

(List continued on next page.)

OTHER PUBLICATIONS

Estimate of IC Engine Torque from Meausrement of Crankshaft Angular Position, Girogio Rizzoni and Francis T. Connolly, Ohio State University (SAE Paper No. 932410).
An On–Line Engine Roughness Meausrement Technique, William P. Mihelc and Stephen J. Citron, School of Mechanical Engineering, Purdue University (SAE Paper No. 840136).

(List continued on next page.)

Primary Examiner—George Dombroske
(74) Attorney, Agent, or Firm—Mark P. Calcaterra

(57) ABSTRACT

The present invention provides a method and system for detecting engine misfire with an optimal compensation of the RPM signal in an internal combustion engine in which the data signal containing a plurality of groups of sample data points is generated. Each of the groups of sample data points represents a cylinder firing event. The data signal is then conditioned for misfire detection processing. The data engine cycle compensation vectors for the RPM zone is then multiplied to the sample data of the RPM. Each group of sample data points is processed using signal processing techniques and then mapped into a single mapped data point. The mapped data points are further processed and then compared to a misfire detection dynamic threshold. A misfire detection signal is then output if any of the mapped data points fall outside the dynamic threshold. The misfire detection system achieves high degree of accuracy through a signal processing and statistical detection technology. The on-line RPM signal compensation reduces the effects to misfire detection caused by the RPM error from various sources and it further enhances the detection performance.

5 Claims, 19 Drawing Sheets

U.S. PATENT DOCUMENTS

| | | |
|---|---|---|
| 4,936,277 | 6/1990 | Deutsch et al. . |
| 4,941,445 | 7/1990 | Deutsch . |
| 4,976,241 | 12/1990 | Ishida et al. . |
| 4,987,711 | 1/1991 | Noji et al. . |
| 4,987,771 | 1/1991 | Iwata . |
| 5,021,960 | 6/1991 | Manaka et al. . |
| 5,044,194 | 9/1991 | James et al. . |
| 5,044,195 | 9/1991 | James et al. . |
| 5,056,360 | 10/1991 | Dosdall et al. . |
| 5,095,742 | 3/1992 | James et al. . |
| 5,109,695 | 5/1992 | James et al. . |
| 5,117,681 | 6/1992 | Dosdall et al. . |
| 5,144,927 | 9/1992 | Denz . |
| 5,200,899 | 4/1993 | Ribbens et al. . |
| 5,231,869 | 8/1993 | Klenk et al. . |
| 5,239,473 | 8/1993 | Ribbens et al. . |
| 5,263,453 | 11/1993 | Wakahara et al. . |
| 5,278,760 | 1/1994 | Ribbens et al. . |
| 5,307,671 | 5/1994 | Akase . |
| 5,313,407 | 5/1994 | Tiernan et al. . |
| 5,357,790 | 10/1994 | Hosoya . |
| 5,361,628 | 11/1994 | Marko et al. . |
| 5,361,629 | 11/1994 | McCombie . |
| 5,379,634 | 1/1995 | Kuroda et al. . |
| 5,381,689 | 1/1995 | Ishida . |
| 5,387,253 | 2/1995 | Remboski, Jr. et al. . |
| 5,392,641 | 2/1995 | McCombie . |
| 5,508,927 | 4/1996 | Remboski, Jr. et al. . |
| 5,515,720 | 5/1996 | Remboski, Jr. et al. . |
| 5,544,521 | 8/1996 | McCombie . |
| 5,561,600 | 10/1996 | McCombie . |
| 5,574,217 | 11/1996 | McCombie . |
| 5,574,646 | 11/1996 | Kawasaki et al. . |
| 5,576,963 | 11/1996 | Ribbens et al. . |
| 5,602,331 | 2/1997 | Prevost . |
| 5,668,725 | 9/1997 | Naik . |
| 5,687,082 | 11/1997 | Rizzoni . |
| 5,699,252 | 12/1997 | Citron et al. . |
| 5,699,253 | 12/1997 | Puskorius et al. . |
| 5,862,507 | 1/1999 | Wu et al. . |

OTHER PUBLICATIONS

Cylinder by Cylinder Engine Pressure and Pressure Torque Waveform Determination Utilizing Speed Fluctuations, Stephen J. Citron, John E. O'Higgins, and Lillian Y. Chen, Engine Controls Lab, School of Mechanical Engineering, Purdue University, West Lafayette, Indiana (SAE Paper No. 890486).

Advanced Signal Processing for Misfire Detection in Automotive Engines, William B. Ribbens and Steven Bieser, ©1995 IEEE.

Analysis and Processing of Shaft Angular Velocity Signals in Rotating Machinery for Diagnostic Applications, Yong W. Kim, Giorgio Rizzoni, Bahman Samimy, Yue Y. Wang, ©1995 IEEE.

Detection of Partial Misfire in IC Engines Using a Measurement of Crankshaft Angular Velocity, Donghyeon Lee (Hyundai Motor Co.) and Giorgio Rizzoni (The Ohio State Univ.) (SAE Paper No. 951070).

Road Tests Results of an I–C Engine Misfire Detection System, W.B. Ribbens and J. Park, University of Michigan (SAE Paper No. 930398).

Road Tests of a Misfire Detection System, William B. Ribbens and Jaehong Park, University of Michigan (SAE Paper No. 940975).

A New Metric for Torque Nonuniformity, William B. Ribbens (SAE Paper No. 830425).

Applications of Precise Crankshaft Position Measurements for Engine Testing, Control and Diagnosis, W.B. Ribbens and G. Rizzoni (SAE Paper No. 890885).

A Mathematical Model Based Method for Diagnosing Failures in Automotive Electronic Systems, W.B. Ribbens (SAE Paper No. 910069).

Onboard Diagnosis of Engine Misfires, William B. Ribbens and Giorgio Rizzoni (SAE Paper No. 901768.

Estimate of Indicated Torque from Crankshaft Speed Fluctuations: A Model for the Dynamics of the IC Engine, Giorgio Rizzoni, IEEE Transactions on Vehicular Technology, vol. 38, No. 3, Aug. 1989 (©1990 IEEE).

Crankshaft Position Measurement with Applications to Ignition Timing, Diagnostics and Performance Measurement, Yibing Dong, Giorgio Rizzoni and William B. Ribbens— ©1987 (SAE Paper No. 871914).

Fast Transforms for Rapid Isolation of Misfiring Cylinders, Giorgio Rizzoni ©1987 (SAE Paper No. 871915).

Applications of Precise Crankshaft Position Measurements for Engine Testing, Control and Diagnostics, W.B. Ribbens and G. Rizzoni (SAE Paper No. 890885).

Torque Nonuniformity Measurements in Gasoline Fueled Passenger Cars Equipped with Automatic Transmission— Theory and Experimental Results, W.B. Ribbens and D. Gross (SAE Paper No. 860414).

A Non–Contacting Torque Sensor for the Internal Combustion Engine, W.B. Ribbens (SAE Paper No. 810155).

Experimental Road Test of a Noncontacting Method of Measuring I–C Engine Torque Nonuniformity, William B. Ribbens, ©1985 (SAE Paper No. 850454).

On–Line Estimation of Indicated Torque in IC Engines Using Nonlinear Observers, Sergey Drankunov, Giorgio Rizzoni and Yue–Yun Wang, The Ohio State University (SAE Paper No. 950840).

Methods of On–Board Misfire Detection, Günther Plapp, Martin Klenk and Winfried Moser, Robert Bosch GmbH (SAE Paper No. 900232).

Misfire Detection by Evaluating Crankshaft Speed—A Means to Comply with OBDII, Martin Klenk and Winfried Moser (Robert Bosch GmbH) and Werner Mueller and Wolfgang Wimmer (Audi AG) (SAE Paper No. 930399).

Diagnosis of Individual Cylinder Misfires by Signature Analysis of Crankshaft Speed Fluctuations, G. Rizzoni, University of Michigan, ©1989 (SAE Paper No. 890884).

Measurement of Engine Misfire in the Lamborghini 533 V–12 Engine Using Crankshaft Speed Fluctuations, P. Azzoni and G. Cantoni (ENEA), G. Minelli and D. Moro (Universitá di Boligna), Giorgio Rizzoni (The Ohio State Univ.), M. Ceccarani and S. Mazzetti (Lamborghini Automobili) (SAE Paper No. 950837).

The Effect of Engine Misfire on Exhaust Emission Levels in Spark Ignition Engines, Ahmed Soliman Giorgio Rizzoni, and Vasanth Krishnaswami, Ohio State University (SAE Paper No. 950480).

Direct Estimation of Cyclic Combustion Pressure Variability Using Engine Speed Fluctuations in an Internal Combustion Engine, Francis T. Connolly, Ford Motor Co. (SAE Paper No. 940143).

A Study of Misfire Detection, James La Palm.

Misfire Detection System for USCAR Low Emission Partnership (DRAFT for a Final Report), W.B. Ribbens, Vehicular Electronics Laboratory, Department of Electrical Engineering and Computer Science, The University of Michigan.

$\tilde{N}(k)$ - fluctuation component of RPM signal N(k)
$\bar{N}(k)$ - averaging component of RPM signal N(k)
$\bar{P}(k)$ - averaging component of MAP signal P(k)
Ne(k) - equalized fluctuation component of RPM signal
  k - discrete sampling index
Fe(.) - system function of the equalizer

'X'---MISFIRE
'O'---NORMAL FIRING

OPTIMAL ENGINE SPEED COMPENSATION METHOD USED IN MISFIRE DETECTION

BACKGROUND OF THE INVENTION

1. Technical Field

The present invention relates generally to internal combustion engines and, more particularly, to an automobile engine misfire detection system.

2. Discussion

Government regulations require automobile manufacturers to control the exhaust of engine combustion byproducts such as hydrocarbons, carbon monoxide, and nitrous oxide. Emission of such byproducts is typically controlled via a catalytic converter which operates at a high temperature and, through the use of a catalyst, burns the aforementioned unwanted exhaust byproducts to reduce automobile emissions. These catalytic converters enable automobile manufacturers to comply with government regulations in a cost-effective manner.

However, if an automobile engine misfires, an increased amount of unburned combustion byproducts is passed through the catalytic converter. Engine misfire occurs as a result of the absence of spark in a cylinder, poor fuel metering, poor compression, or other similar conditions. Over time, regular engine misfire can lead to damage of the catalytic converter and, consequently, increased amounts of unburned byproducts being admitted into the atmosphere.

As a result, regulatory agencies such as the California Air Resources Board (CARB) require that many motor vehicles with feedback fuel control systems be equipped with an emission malfunction indicator that identifies a misfiring engine and the particular malfunctioning component or components. Thus, upon the malfunction indicator being activated, the vehicle operator could proceed to a qualified vehicle repair center to have the malfunctioning component repaired or replaced before an excessive amount of exhaust byproducts is emitted into the air by the vehicle.

Typically, these malfunction indicators generate data allowing identification of specific misfiring engine cylinders. In particular, the CARB rules, known as On-Board Diagnostics II guidelines, mandate that the automobile manufacturer specify a percentage of misfires out of the total number of firing events necessary for determining malfunction for: (1) the percent misfire evaluated in a fixed number of revolution increments for each engine speed and load condition which would result in catalyst damage; (2) the percent misfire evaluated in a certain number of revolution increments which would cause a motor vehicle to fail a federal test procedure by more than 1.5 times the CARB standard if the degree of misfire were present from the beginning of the test; and (3) the degree of misfire evaluated in a certain number of revolution increments which would cause a motor vehicle to fail inspection and a maintenance program tailpipe exhaust emissions test. It is contemplated that similar rules are or may be enacted by other states as by the federal government in the foreseeable future.

Government regulations such as those mandated by CARB also require that automobile manufacturers be able to provide information identifying misfiring engine cylinders. This misfire information is typically collected and stored in a computer memory associated with the automobile engine and later downloaded at a service center and is used in diagnostic testing of the vehicle. One misfire detection and identification approach is disclosed in U.S. Pat. No. 5,361,629, issued Nov. 8, 1994 entitled "Single Sensor Misfire Detection Apparatus and Method for an Internal Combustion Engine". The misfire detection approach disclosed in the aforementioned patent senses crankshaft rotation and calculates a crankshaft velocity based on the sensed rotation of a sensor wheel associated with the crankshaft. The calculated crankshaft velocity changes or a compensated velocity change is compared to a predetermined stored crankshaft velocity range to determine engine misfire.

Additional engine misfire detection approaches are disclosed in U.S. Pat. No. 5,574,217 issued Nov. 12, 1996 for "Engine Misfire Detection with Compensation for Normal Acceleration of Crankshaft"; U.S. Pat. No. 5,544,521 issued Aug. 13, 1996 for "Engine Misfire Detection with Rough Road Inhibit"; and U.S. Pat. No. 5,602,331 issued Feb. 11, 1997 for "Engine Misfire Detection with Cascade Filter Configuration". The approaches disclosed in the above mentioned patents relate to engine misfire detection including sorting of a plurality of changes in crankshaft angular velocity, as measured by sensing rotation of a sensor wheel associated with the crankshaft, over a predetermined series of cylinder firings in averaging the two middle most angular velocity changes to provide an average change in velocity value. The deviation is determined between the change in angular velocity for a selected cylinder and the average change in velocity value. Misfires are detected as a function of a comparison of the deviation with a predetermined threshold velocity value stored in a system controller.

Generally, a number of conventional misfire detection approaches work well at engine speeds below 4000 rpm. At these lower engine speeds, cylinder identification engine misfire detection can be realized through monitoring of engine rpm alone. Even at low engine speeds, however, transient signals caused by conditions such as powertrain bobble, engine noise, changing of gears, or engine acceleration and deceleration may cause false engine misfire detection. Additionally, at higher engine speeds of typically greater than 4,000 rpm, engine induced crankshaft flex, or torsional vibration, can cause false engine misfire detection.

Many conventional misfire detection approaches analyze engine firing frequency through a fast fourier transform (FFT) or other similar frequency domain-based analysis to determine whether an engine misfire has occurred for a particular cylinder firing event. However, the aforementioned approaches are typically complex.

Further, many conventional misfire detection methods utilize low data rate sampling of engine crankshaft velocity or acceleration where crankshaft angular velocity is sampled only once per cylinder firing event. With low data rate sampling, higher order harmonic components of the engine firing frequency, which often contain valuable misfire information for higher engine speeds, frequently are folded back, or aliased, into lower noise-related engine frequencies. These aliased signals may cause misinterpretation of cylinder firing event data.

Further, U.S. Pat. No. 5,824,890 for "Real Time Misfire Detection for Automobile Engines" relates to a misfire detection technique that can identify multiple engine misfires through evaluation of engine speed and average MAP data alone, without the need for complex frequency-based methods of analysis, such as Fast Fourier transform-based methods, or the need for additional engine system data such as engine temperature or throttle feedback data. Also, the above patent relates to an engine misfire detection method in which one of a multiple of FIR filter banks is operative over a predetermined range of engine speeds to provide effective removal of noise related signals from the signal representing crankshaft angular velocity that samples crankshaft angular velocity at a high data rate of 18 samples per cylinder firing event so that change in crankshaft angular velocity over a given band of engine frequencies around the engine firing frequency may be determined to produce more accurate engine misfire calculations and that utilizes MAP data to set a particular signal threshold for a given set sampled crankshaft angular velocities.

U.S. Pat. No. 5,862,507 for "Real-Time Misfire Detection for Automobile Engine With Medium Data Rate Crankshaft Sampling" presents an advanced misfire detection method that can use lower sampling data rate and achieves high degree of accuracy of detection through a multi-stage signal conditioning, multi-rate signal processing and statistical decision technology and a mixed size of window sampling strategy.

Also, U.S. Pat. No. 5,744,722 for "Deconvolution Method of Resonance Detection and Removal from Crankshaft Speed Measurements" and U.S. Pat. No. 5,717,133 for "Mixed Sampling Rate Processing for Misfire Detection" disclose systems and techniques for improving misfire detection accuracy.

The engine speed or crank shaft speed fluctuation based misfire detection methods have been adopted by many automotive manufactures because of their signal availability, overall low implementation cost and adequate detection performance under most conditions. Misfire detection with a crankshaft speed fluctuation method is based on the information of crankshaft speed changes when a misfire occurs. Thus, accuracy of the measurement of crankshaft speed (RPM) will directly affect the detection performance, especially for higher RPM engine operating conditions.

Usually, a crankshaft target and a sensor, such as Hall effect sensor, that generates electrical tooth edge to edge waveform, are used in measurement of RPM in a vehicle. The RPM is calculated from the measured time interval between the tooth edges and its corresponding angular interval of tooth edges on the target. Several factors may cause inaccuracy of RPM measurement in this process.

One error source is from the inaccuracy of the target edge-to-edge intervals. It is also difficult to characterize each tooth's angular interval for each target in mass production. Thus, the designed target tooth angular intervals which are used in the above RPM calculation will cause inaccuracy of RPM calculation. In real situations, the sensors themselves will introduce electronic noise and cause inaccuracy of time interval measurement. A crankshaft target is usually used for multiple purposes in an engine control system. The teeth of a target may be arranged in different sizes and/or some teeth could be missing, for instance, for engine synchronization. The uneven target tooth pattern also introduces noise from a sensor in the time interval measurement. For a common crankshaft target used in different engine families ranging from four cylinder engines to ten cylinder engines, a high sampling window data may need to be reorganized to become a set of suitable lower sampling window data in different manners. Because of tooth missing, some interpolation techniques for the new window data may be required. The interpolation process will cause extra error in RPM data. In addition to these component, system or window interpolation errors, the detection performance may also be degraded by the quasi-periodic engine combustion noise, in particular, when RPM is high.

While the above described misfire detection approaches are effective in detecting engine misfire, there is still room for improvement in the art. In particular, there is a need or a comprehensive and systematic method to overcome the effects of misfire detection caused by the RPM error from various sources.

SUMMARY OF THE INVENTION

The present invention provides a method and system for detecting engine misfire in an internal combustion engine. The present invention provides a method to optimally search for RPM engine cycle compensation vectors for predefined RPM zones from vehicle test data with a given searching criterion and to do real time engine speed compensation in a vehicle based on the compensation vectors.

More particularly, the present invention provides a method of detecting engine misfire in an internal combustion engine in which the data signal containing a plurality of groups of sample data points is generated. Each of the groups of sample data points represents a cylinder firing event. The data signal is then conditioned for misfire detection processing. The data engine cycle compensation vectors for the RPM zone is then multiplied to the sample data of the RPM. Each group of sample data points is processed using signal processing techniques and then mapped into a single mapped data point. The mapped data points are further processed and then compared to a misfire detection dynamic threshold. A misfire detection signal is then output if any of the mapped data points fall outside the dynamic threshold.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 29b shows the signature of the output of the decimation block of the misfire detection system without any compensation to the input raw RPM data as shown in FIG. 29a;

FIG. 30b shows the signature of the misfire detection system output without any compensation to the input raw RPM data as shown in FIG. 30a;

DETAILED DESCRIPTION OF THE PREFERRED EMBODIMENTS

Figure 1:
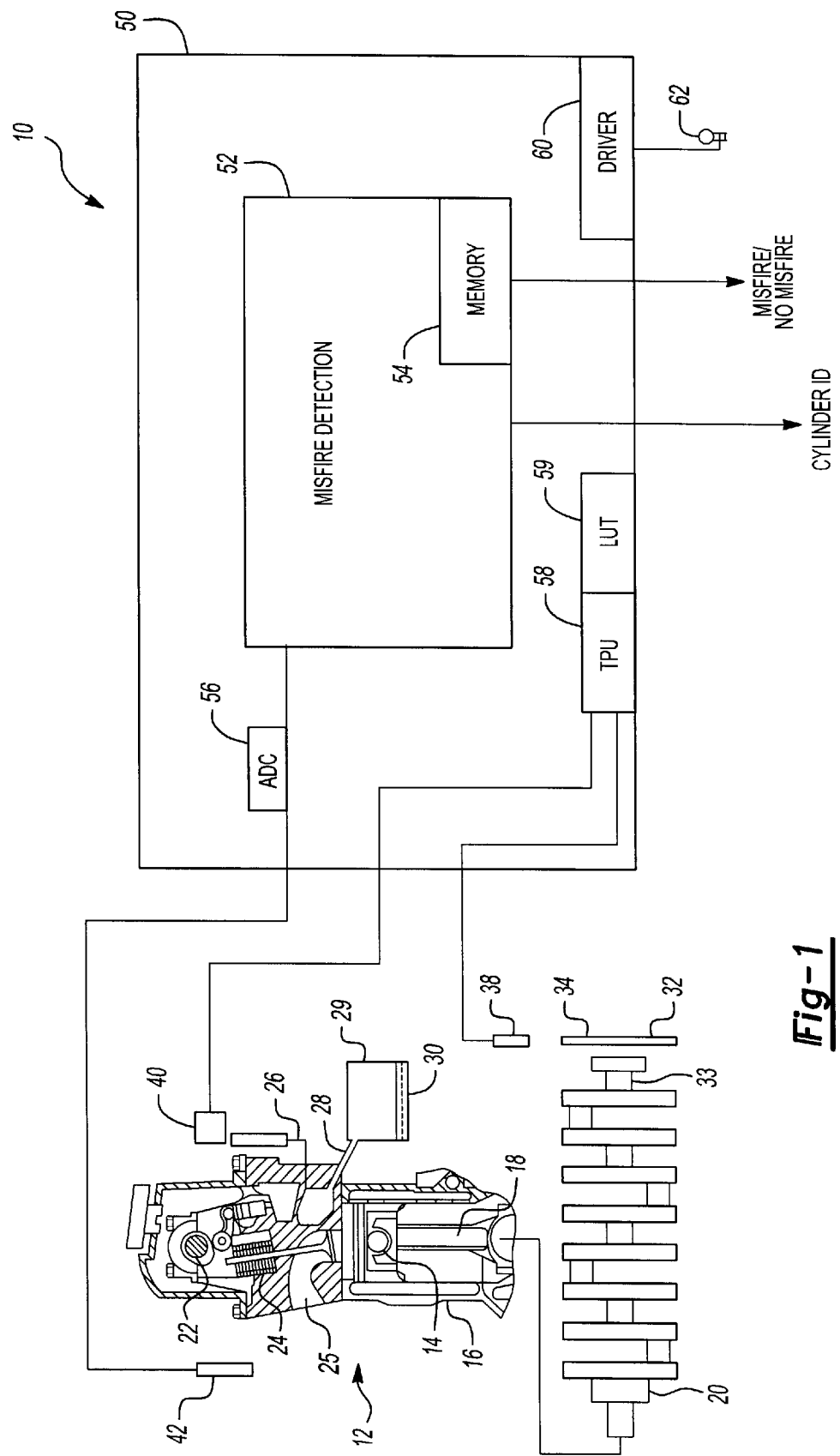
FIG. 1 illustrates a side elevational view of a spark-ignited internal combustion motor vehicle engine in cross-section, a crankshaft associated with the engine, and a block diagram of a motor vehicle electronic control unit in which the misfire detection system of the present invention is implemented.

Referring now to the drawing figures, a block diagram of the engine system, in which the misfire detection system of the present invention is implemented, is shown generally at 10. The system 10 includes an internal combustion spark ignited engine 12, shown in partial cross-section, which is of the type implemented in a conventional motor vehicle (not shown). The engine contains a plurality of cylinders, represented by the cylinder 14, with each of the cylinders having a piston, represented by the piston 16, operatively disposed therein. Each of the pistons is connected by a connecting rod 18 to a crankshaft 20. A conventional engine cam shaft 22 is also operatively located within the engine for opening and closing intake and exhaust valves, such as the intake valve 24, associated with the cylinder 14 for supplying a fuel/air mixture to the cylinders in a manner well known in the art during the piston intake. A manifold 25 is also operatively associated with the intake valve 24 for supplying air from outside of the engine into the cylinder 14 to provide air for the valve fuel/air mixture supplied to the cylinder.

The engine 12, for example, is a conventional, four-stroke engine having an intake stroke in which fuel and air mixture is input into the cylinder 14 through the intake valve 24, a compression stroke in which the fuel/air mixture is compressed by the piston 16, an expansion stroke in which a spark supplied by a spark plug 26 ignites the fuel/air mixture, and an exhaust stroke during which gases from the burned fuel are exhausted from the cylinder through an exhaust system 28, which includes a catalytic converter 29 having an associated catalyst 30. Although the preferred embodiment of the present invention is implemented in a four, six, or eight cylinder, four-stroke engine such as that shown at 12, it should be appreciated that the present invention may be implemented in any conventional engine system, including a two-stroke engine system, or any spark ignited or diesel engine system.

Figure 2:
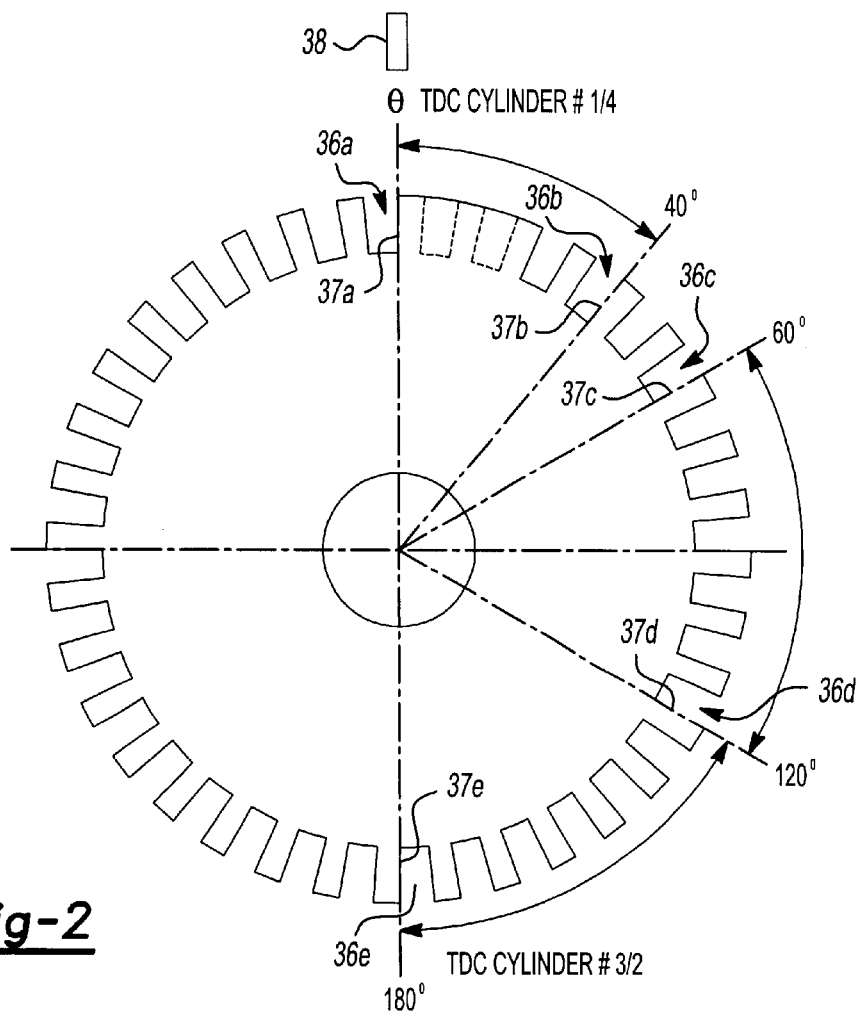
FIG. 2 is an enlarged front view of the crankshaft sensor wheel and crankshaft sensor shown in FIG. 1.

Still referring to FIG. 1, a crankshaft sensor wheel 32 is operatively fastened to a sensor wheel mount nose 33 by screws or other similar fastening devices. The sensor wheel mount nose is in turn spot welded or otherwise operatively connected to the crankshaft. Referring to FIG. 2, the crankshaft sensor wheel 32 includes a plurality of teeth 34 defining slots 36 therebetween. The slots 36 operate as crankshaft angular velocity sensing points for measuring the angular velocity of the crankshaft, and thus the engine speed. It should be understood that the terms engine speed and crankshaft angular velocity may be used interchangeably throughout the specification.

Referring again to FIG. 2, a slot 36a is formed in the crankshaft wheel 32 at a position corresponding preferably to a piston position of about 0° top dead center (TDC) at the end of the piston compression stroke. At least one slot 36b is formed in the wheel 32 adjacent the slot 36a and preferably at a position corresponding to a piston location at 40° after TDC. However, it should be appreciated that other slots may be formed in the crankshaft sensor between the slots 36a, 36b to initiate ignition timing control or for other timing purposes. First and second edges 37a, 37b are associated with the first and second slots 36a, 36b. The first edge corresponds to the initiation of crankshaft angular velocity measurements for cylinder numbers 1 and 4 in the four cylinder engine arrangement, while the second edge corresponds to the termination of these measurements. Also, two slots 36c, 36d are formed in the crankshaft sensor wheel 32 to form third and fourth edges 37c, 37d, with the third edge being oriented 20° apart from the second edge 37b on the crankshaft sensor wheel, and with the third and fourth edges being spaced about 60° apart from one another. In addition, a slot 36e is formed in the crankshaft sensor wheel 32 to form a fifth edge 37e with the fourth and fifth edges being spaced about 60° apart from one another.

It should be appreciated that the engine cylinders 1 to 4 for a four cylinder engine are oriented in a conventional straight-line configuration. As a result, each cylinder has a 180° expansion stroke with a cylinder firing order of 1-3-4-2. Angular velocity measurements for the crankshaft 20 are measured by determining the time period for crankshaft angular displacement Θ as follows: the initial velocity measurement is taken for a 40° interval for each of the four cylinders after the piston reaches top dead center (TDC) at the end of the compression stroke. This 40° interval preferably begins at the end of the piston compression stroke. Subsequently, a second angular velocity measurement is taken for a 60° expansion stroke interval for each of the four cylinders after an approximately 20° angular displacement from the end of the initial 40° interval. A third angular velocity measurement is taken for a 60° expansion stroke interval for each of the four cylinders immediately following the second measurement. By measuring the time period for each of the above three unequal angular displacement intervals, a medium data rate (MDR) sampling of the crankshaft is achieved.

It should be appreciated that the misfire detection system of the present invention is realized through medium data rate crankshaft sampling wherein two or three intervals of crankshaft sensor wheel rotations are measured per cylinder firing event. However, the data sampling rate may alternatively encompass any number of sampling intervals between, for example, 2 and 18 sampling intervals, limited by the capability of data acquisition and processing, per cylinder firing event. The crankshaft sensor wheel angular displacement associated with each sampling interval may also vary according to specific system implementation.

Referring again to FIG. 1, the system 10 also includes a crankshaft sensor 38 in communication with the sensor wheel 32, and a cam position sensor 40 in communication with the cam shaft 22. Both the crankshaft sensor 38 and the cam shaft sensor 40 generate signals used by the misfire detection system of the present invention in a manner discussed in detail below. The crankshaft sensor 38 measures time elapsed between rotation of slot edges 37a, 37b, and subsequently edges 37c, 37d, and 37d, 37e, past the crankshaft sensor 38. The crankshaft sensor subsequently generates an analog signal corresponding to this rotation time period that is utilized in determining crankshaft angular velocity, and thus engine speed, as will be described in detail below.

The cam shaft sensor 40 is utilized for identification of specific cylinder firing events and is implemented based on the fact that the cam shaft 22 rotates 360° for every 720° of rotation of the crankshaft 20. Cylinder firing event identification enables the misfire detection system of the present invention to indicate which cylinder or cylinders are misfiring. The engine system 10 preferably uses a stock cam sensor and associated cylinder identification technique to determine the TDC of the number 1 cylinder. However, other cylinder identification techniques may be used according to the specific engine system.

The system 10 additionally includes a manifold absolute pressure (MAP) sensor 42 for measuring fluctuations in the air pressure in the manifold 25. Additional engine system components and sensors are not shown, as such components and sensors are conventional and are well known to those skilled in the art. It should be appreciated at this point that the crankshaft sensor 38 and the cam shaft sensor 40 may be Hall effect sensors, optical sensors, variable reluctance sensors, or any other type of position sensors well known in the art. The MAP sensor 42 is a typical piezoelectrical pressure sensor well known in the art. Each of the sensors 38, 40 and 42 generates an electrical signal representative of the sensed condition and sends this signal to an electronic control unit (ECU) 50 associated with additional control circuitry (not shown) within the motor vehicle.

The ECU 50 includes a micro-controller 52 having an associated memory 54 and analog to digital converters 56 for converting analog signals from the sensor 42 to digital signals. The memory 54 is a memory of the type well known in the art and includes a random access memory (RAM), a read-only memory (ROM), and/or any other similar type of conventional computer memory. A time processor unit (TPU) 58, also implemented at the ECU 50, processes outputs from the sensors 38 and 40, for use in the misfire detection system of the present invention, and provides timing signals and other data processing. The ECU 50 also includes a lamp driver 60 which, upon the appropriate output signal being generated by the micro-controller 52, drives an output display such as a driver warning light 62. The electronic control unit further includes additional timers, counters and like components of the type typically associated with a conventional micro-controller.

Figure 3A:
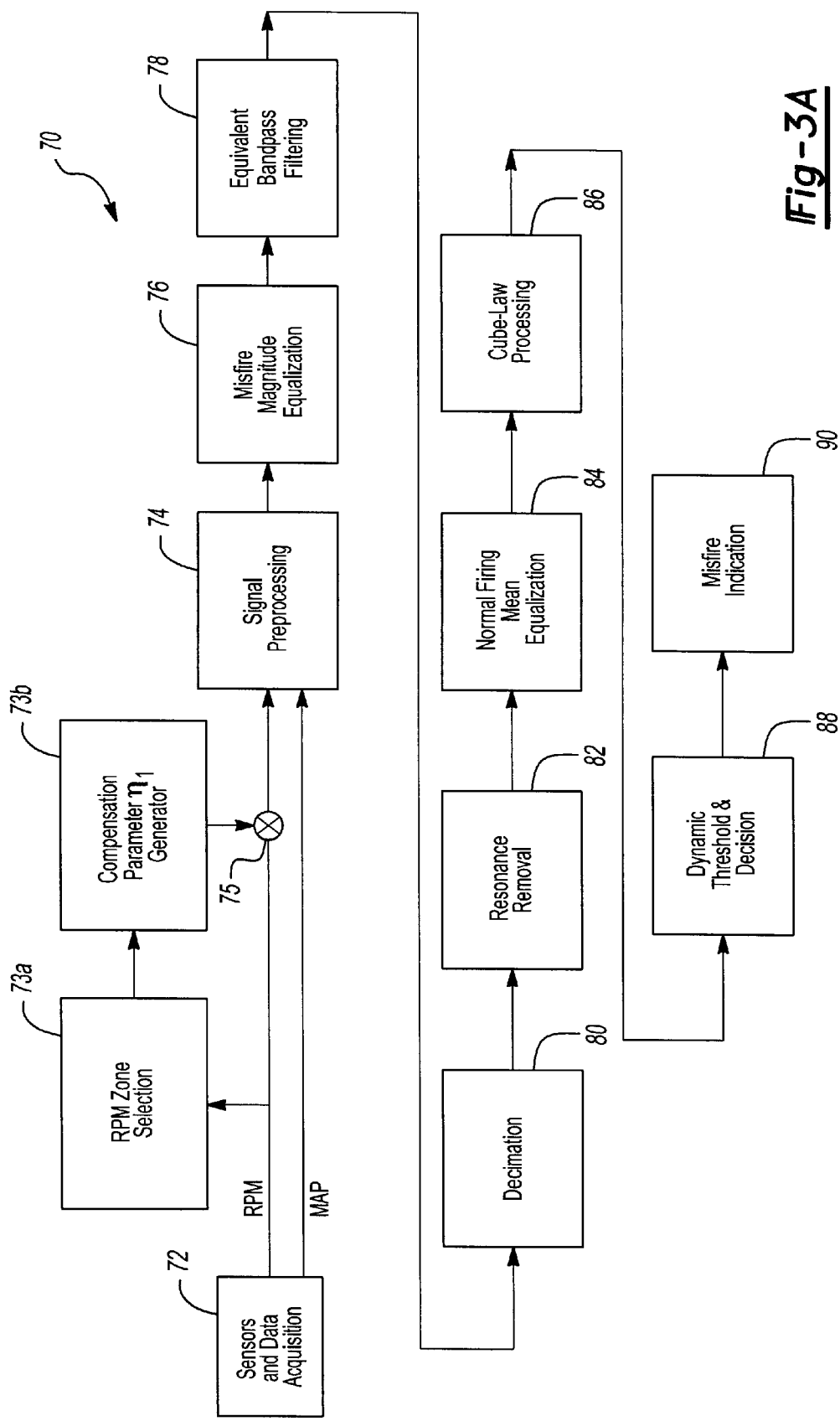
FIG. 3A is a block diagram of the methodology utilized in the misfire detection system according to a preferred embodiment of the present invention.

Referring to FIG. 3A, a block diagram of the medium data rate misfire detection system is shown at 70. The MDR misfire detection system of the present invention is preferably realized through conventional controllers such as the commercially available Chrysler SBEC III controller having an HC16 conventional microcontroller. The system of the present invention can be realized in such a conventional controller because of its low computational requirement. With the particular selection of the sampling window sizes, the MDR system of the present invention, which utilizes three data points per fifing for misfire detection, exhibits a high degree of accuracy close to that of utilization of high data rate (18 sensor wheel data points per cylinder firing event) but needs only approximately twenty (20%) percent of the computational requirements for the high data rate systems. This low computational requirement is even lower than that of many current low data rate (1 data point measured per cylinder firing event) systems, such as the low data rate system currently realized in the SBEC III controller.

The MDR misfire detection system achieves this high degree of accuracy through a multi-stage signal conditioning and multi-rate signal processing technique realized via the processing blocks shown in the system 70. The processing blocks are implemented at the controller 50 through conventional software programming techniques, such as assembly languages of Motorola HC 16 microcontroller or DSP processors. Alternatively, the processing blocks may be realized via hardware implementation, such as programmable logic devices.

In an engine controller unit, the engine speed, denoted as N in RPM, is calculated in the following formula:

$$N = \frac{\theta}{6T}$$

where $\theta$ is the angular interval of the data sampling window in degrees and T is the time in seconds spent during this window interval when the target is rotating.

If the time interval has a measured error $\Delta T$ caused by some reason such as component, system, window interpolation errors and engine combustion noise, and its corresponding equivalent target angular interval $\Delta\theta$ can be obtained, then the effects to the RPM estimation caused by the error $\Delta T$ can be minimized when the RPM is calculated as follows:

$$N = \frac{\theta + \Delta\theta}{6(T+\Delta T)} = \frac{\theta\eta}{6T_m} = \hat{N}\eta$$

where $\eta=1+\Delta\theta/\theta$, $T_m=T+\Delta T$ and $\hat{N}=\theta/(6T_m)$.

In real situations, $T_m=T+\Delta T$ is obtained from measurement. But $\Delta\theta$ is not easy to be obtained, and, thus, the parameter $\theta$ is not known.

This invention presents a method to estimate the compensation parameters $\theta$ for each window data point in one engine cycle based on vehicle test data. These compensation parameters can be written into a vector $\theta=[\theta_1, \theta_2, \ldots, \theta_n]$, where n is the number of total parameters. For example, there are three data points for each firing event, then there are eighteen data windows in an engine cycle for a V6 engine and n=18 (there are twelve data windows for a four cylinder engine). It is possible to reduce the number of compensation parameters if the data windows to be compensated are carefully selected from review of data on FIG. 29c. For example, it can use only n=6 parameters to compensate six data windows for a V6 engine. For example, the selected six data points in the data window index are labeled as n=1 . . . n=6 in FIG. 29c. The advantage is that it will reduce by 66 percent the computation amount without obvious degradation of the performance in this example.

Figure 28:
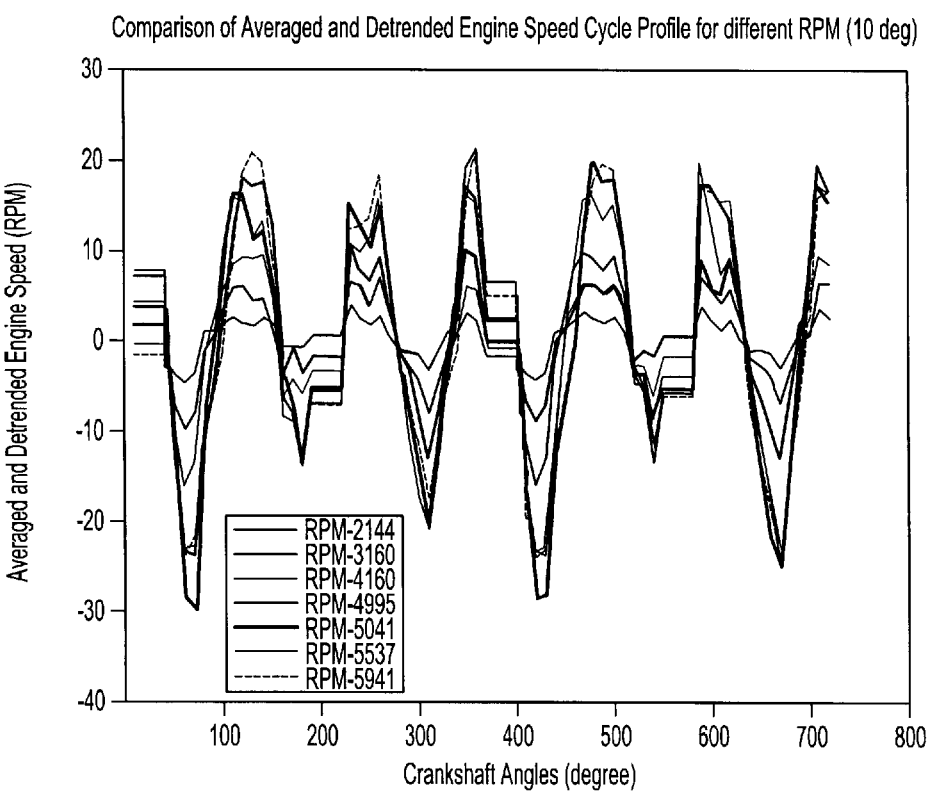
FIG. 28 graphically illustrates a comparison of averaged and detrended engine speed cycle profiles for different engine speeds.

The advantage of applying the compensation based on an engine cycle instead of based on only a crankshaft revolution is that it will more effectively reduce the effects of the quasi-periodic combustion profile to the misfire detection caused by the cylinder combustion process. FIG. 28 shows averaged and detrended V6 RPM combustion profiles at different engine RPMs.

To achieve better compensation performance in all RPM ranges, the compensation vector scheme is divided into m RPM zones. For each RPM zone, there are corresponding compensation vectors $\theta$ at zone boundaries. These compensation vectors $\theta$ are obtained from vehicle test data as will be described below. Within each RPM zone, the compensation parameter $\theta$ for a give RPM sampling window data are linearly interpolated from its zone boundary compensation vectors $\theta$.

The system 70 includes a sensor and data acquisition block 72 which feeds data into an RPM zone selection block 73A. Blocks 73A and 73B provide the real time engine speed compensation used in misfire detection. In the block diagram of FIG. 3A, the input RPM is first fed to the RPM zone selection block 73A to decide which RPM zone it locates and then block 73B generates a corresponding compensator parameter $\theta$, to multiply by the input RPM at multiplier block 75. Finally, the compensated RPM is fed to the signal preprocessing block 74 of the misfire detection system.

Figure 3B:
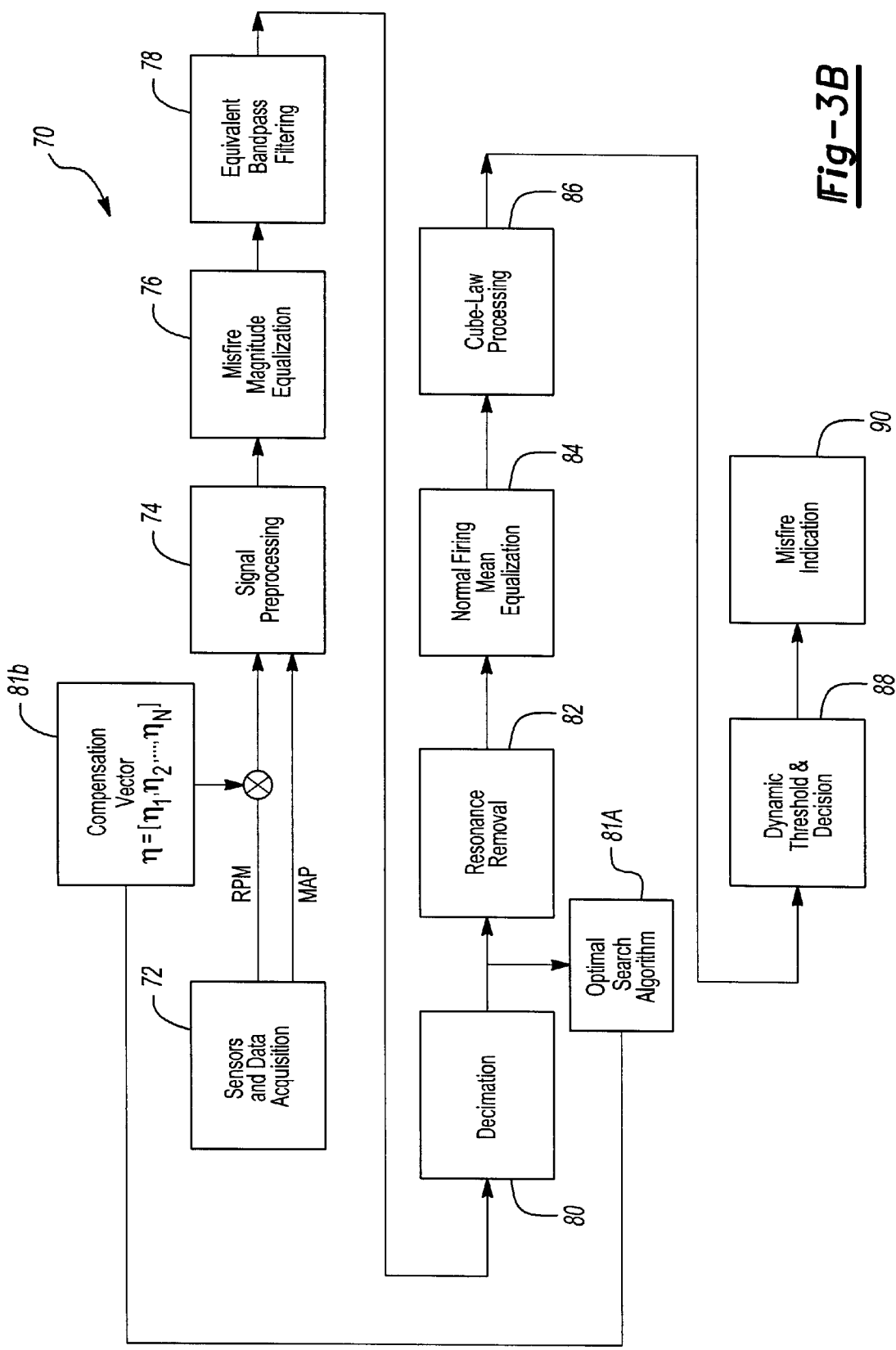
FIG. 3B is a block diagram of the methodology utilized in determining the engine speed compensation vectors for the misfire detection system according to a preferred embodiment of the present invention.

The optimal search for the compensation vectors includes two steps, as shown in FIG. 3B. The first step is to collect and process vehicle data (blocks 72, 74, 76, 78, 80). The second step at block 81A is to find the compensation parameters using an optimal search algorithm, described mathematically as $$\min_{\eta} Q(\eta, \hat{N})$$

Where $Q(\eta, \hat{N})$ is the objective function we are trying to minimize.

From the view point of misfire detection, the most relevant characteristics of interest is the separation performance of two signals, normal firing and misfire signature. The larger of the two signals' separation, the easier it is to make a decision whether misfire has occurred or not. In addition, the smaller the normal firing signal's variation, the easier it is for misfire detection.

Figure 10:
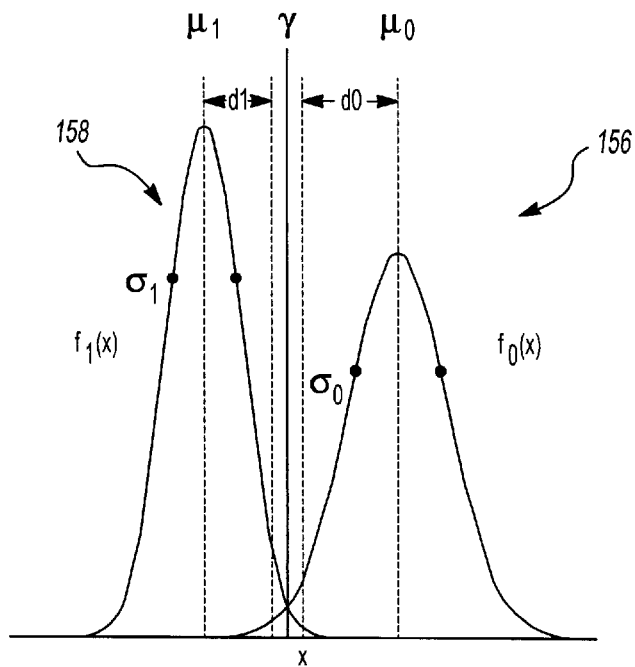
FIG. 10 is a graph illustrating a threshold that separates the misfire signal and normal firing signals given the probability density functions of FIG. 7.

Based on the above ideas, two criteria are disclosed herein for providing the objective function for determining the optimal compensation vectors. The first one is to find the compensation vector $\theta=[\theta_1, \theta_2, \ldots \theta_n]$ (at block 81B) that makes the difference of the means divided by the sum of the standard deviation (DMSS value) maximum. The DMSS value is a measure of the separation performance of misfire signature and normal signature. It is defined as $$DMSS = \frac{|\mu_1 - \mu_0|}{\sigma_1 + \sigma_0}$$

where $\mu_0$ and $\Phi_0$ denote the mean and standard deviation of a normal firing signature, and $\mu_1$ and $\Phi_1$ denote the mean and standard deviation of a misfire signature. FIG. 10 illustrates an example of the normal firing and misfire signature distribution curves with the mean and standard deviation values plotted thereon. With this criterion, the objective function can be written as $$Q(\eta, \hat{N}) = -DMSS(\eta, \hat{N})^2.$$

The above equation is then solved to find the compensation vector $\theta$ where DMSS is maximum.

An alternative criterion is to take the standard deviation as the objective function, that is, $$Q(\eta, \hat{N}) = \sigma_0(\eta, \hat{N})^2$$

where $\Phi_0$ denotes the standard deviation of a normal firing signature.

Test data collection is based on each criterion. For the DMSS criterion, data are collected in an engine steady state with an induced 100 percent random misfire pattern and low absolute manifold pressure (MAP) for each preselected engine speed.

For the alternative standard deviation (SD) criterion, data are collected in an engine steady state with no induced misfire and low absolute manifold pressure (MAP) for each preselected engine speed.

In general, the process to minimize the objective function is a multiple dimensional search problem and takes quite an amount of time for computation and requires an initial guess for the compensation vectors. For this particular application, the utilization of a sequential one-dimensional search within a pre-bracketed searching interval for each compensation component will greatly reduce the computation time. This searching strategy is not only efficient but also robust. It is easy to be used in the production environment.

After obtaining the compensation vectors from vehicle test data for each of the predefined engine speed zones, a linear interpolation coefficient matrix for each RPM zone and each to be compensated data windows is generated. This coefficient matrix is downloaded into the vehicle where the test data are from the particular vehicle or all the family of the vehicle, depending on the compensation purpose. If full compensation is needed, then the individual compensation for each vehicle is required. Otherwise, if the purpose is to compensate for the systematic errors caused by tooth missing, data window interpolation, combustion noise and sensor noise, then a common compensation method may be a good choice. In the common compensation method, the compensation vectors are obtained from one or a few vehicles and then applied to all vehicles in the family. Thus, it greatly enhances the productivity. FIG. 3B illustrates a block diagram of the optimal search for engine speed compensation.

Figure 29A:
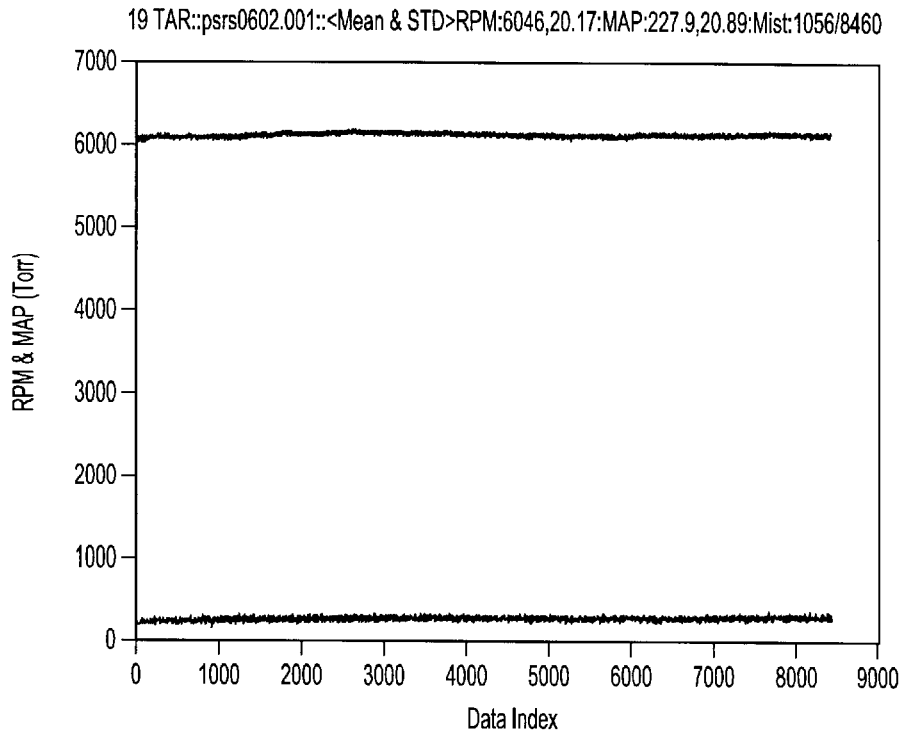
FIG. 29a shows raw V6 engine test data used for compensation vector searching using DMSS criterion. The operating condition is RPM=6046, MAP=227.9 Torr, 100% random misfire.
Figure 29B:
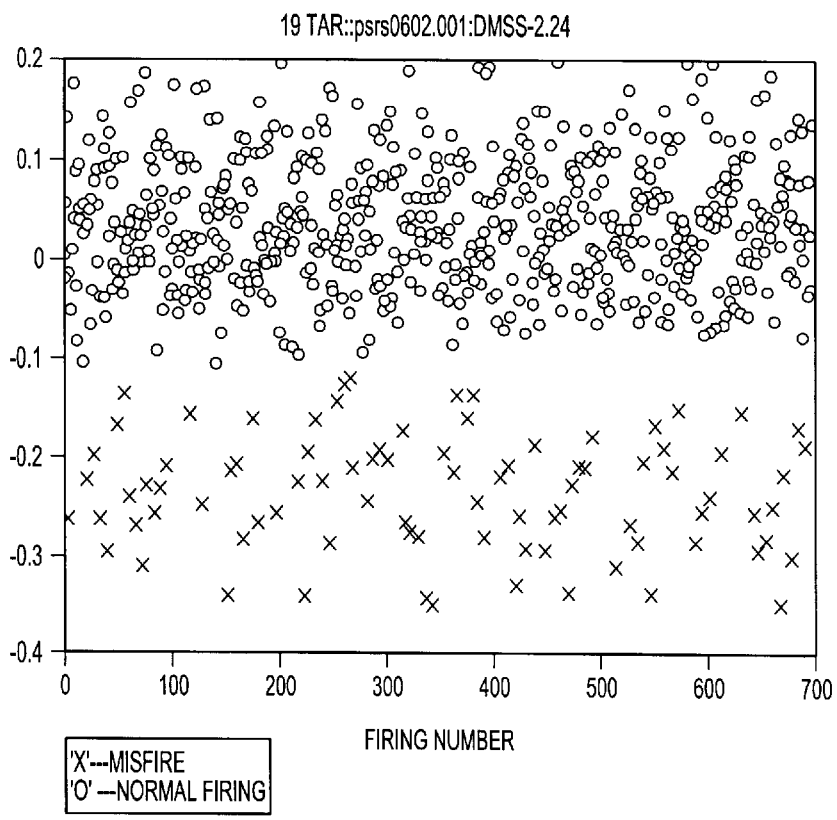

FIG. 29a shows raw V6 engine test data used for compensation vector searching using DMSS criterion. The operating condition is RPM=6046, MAP=227.9 Torr, and 100% random misfire. FIG. 29b shows the signature of the output of the decimation block of the misfire detection system without any compensation to the input raw RPM data as shown in FIG. 29a.

Figure 29C:
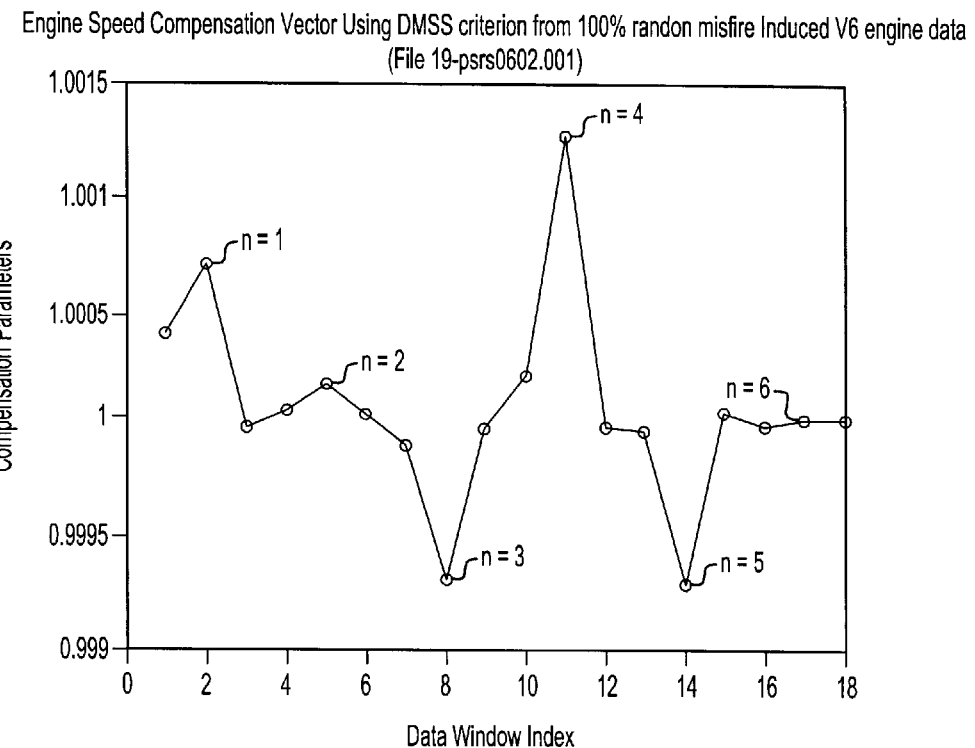
FIG. 29c plots a compensation vector generated from the test data, shown in FIG. 29a, with the DMSS criterion and 18 compensation data windows.

FIG. 29c plots a compensation vector generated from the test data, shown in FIG. 29a, with the DMSS criterion and eighteen compensation data windows (three data windows for each firing event). As discussed above, the calculation requirements can be reduced by carefully selecting just one compensation data window for each firing event as labeled n=1 through n=6.

Figure 29D:
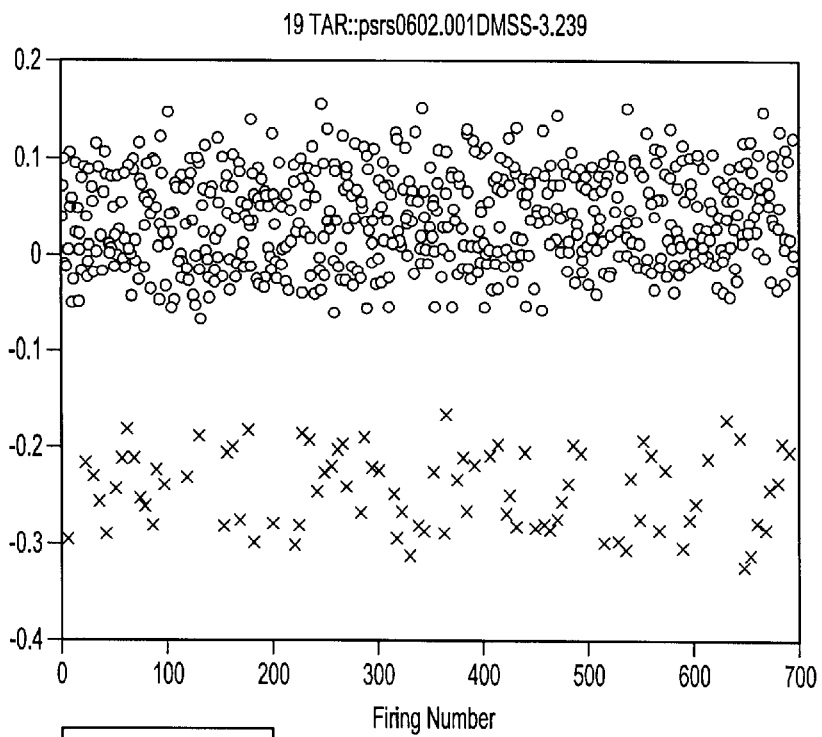
FIG. 29d shows the signature of the output of the decimation block of the misfire detection system with the compensated RPM input using the compensation vector shown in FIG. 29c.

FIG. 29d shows the signature of the misfire detection system output with the compensated RPM input using the compensation vector η shown in FIG. 29c. In comparison with the signature of the raw RPM data shown in FIG. 29b, the misfire events are more easily determined based upon a clearer separation between the normal firing and misfire data points.

Figure 30A:
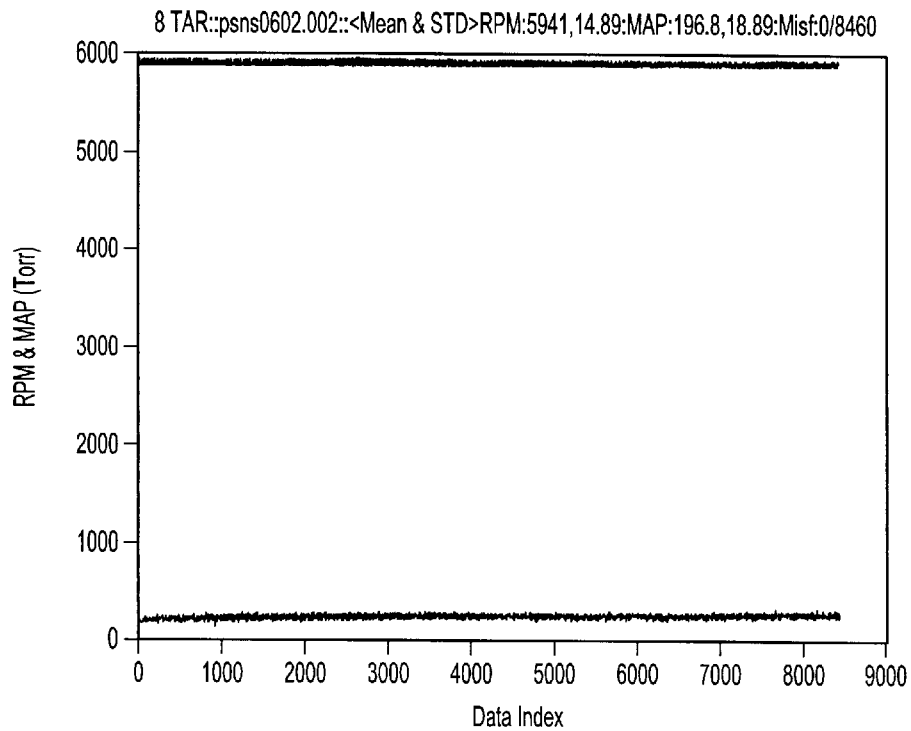
FIG. 30a shows raw V6 engine test data used for compensation vector searching using SD criterion. The operating condition is RPM=5941, MAP=198.8 Torr, no misfire induced.
Figure 30B:
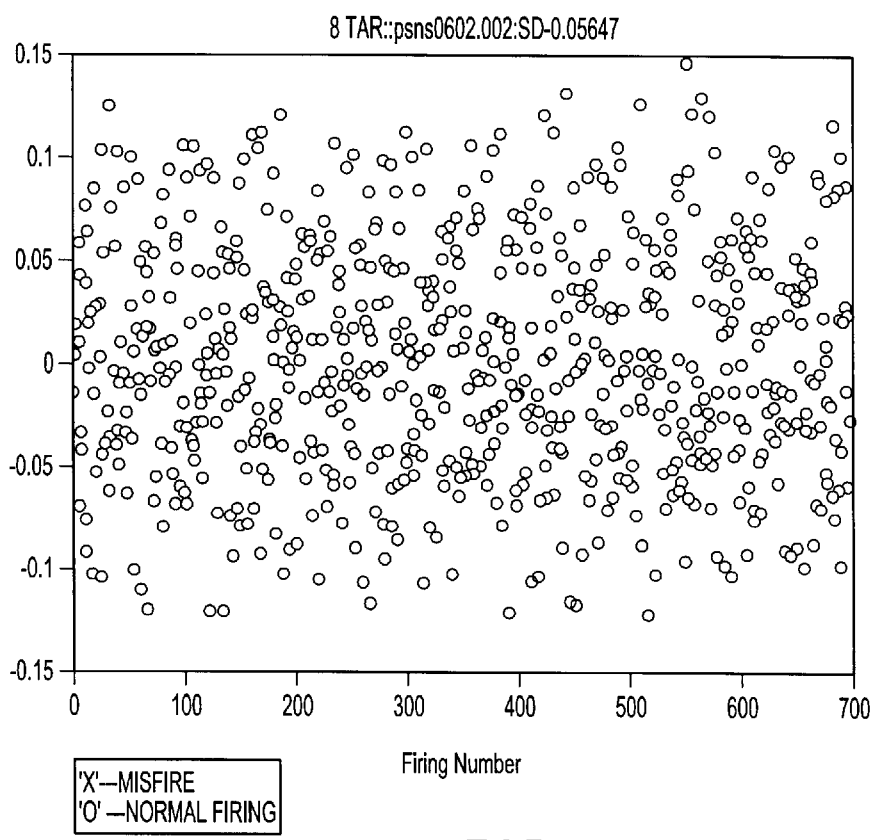

FIG. 30a shows a raw V6 engine test data used for compensation vector searching using the alternative standard deviation (SD) criterion. The operating condition is RPM=5941, MAP=198.8 Torr, with no misfire induced. FIG. 30b shows the signature of the misfire detection system output without any compensation to the input raw RPM data as shown in FIG. 30a.

Figure 30C:
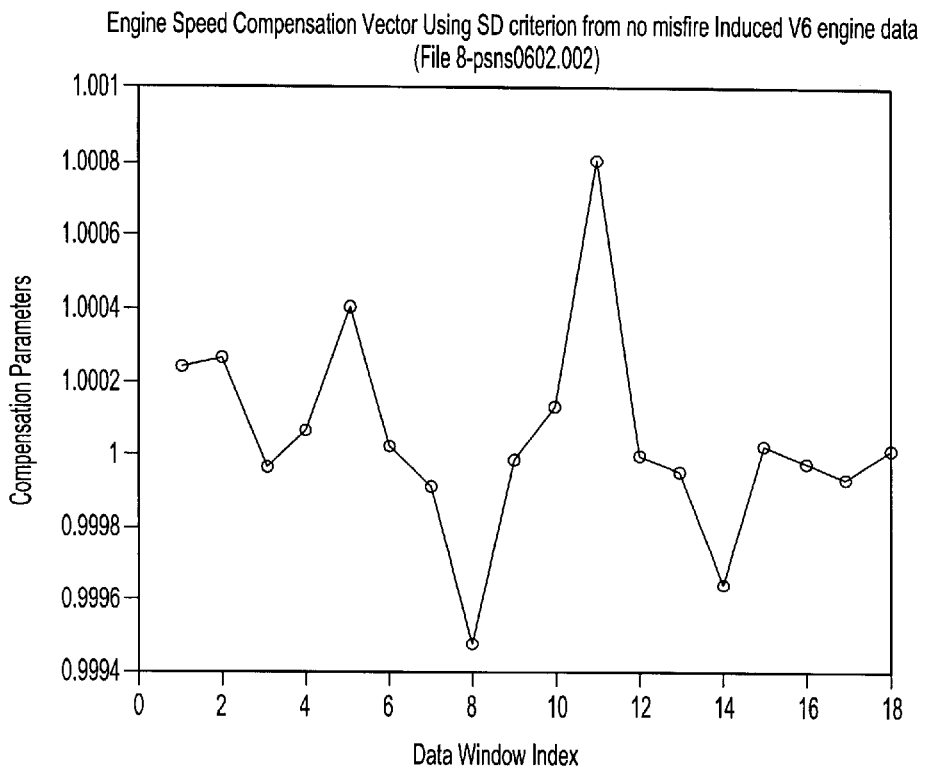
FIG. 30c plots a compensation vector generated from the test data, show in FIG. 30a, with the SD criterion and 18 compensation data windows.
Figure 30D:
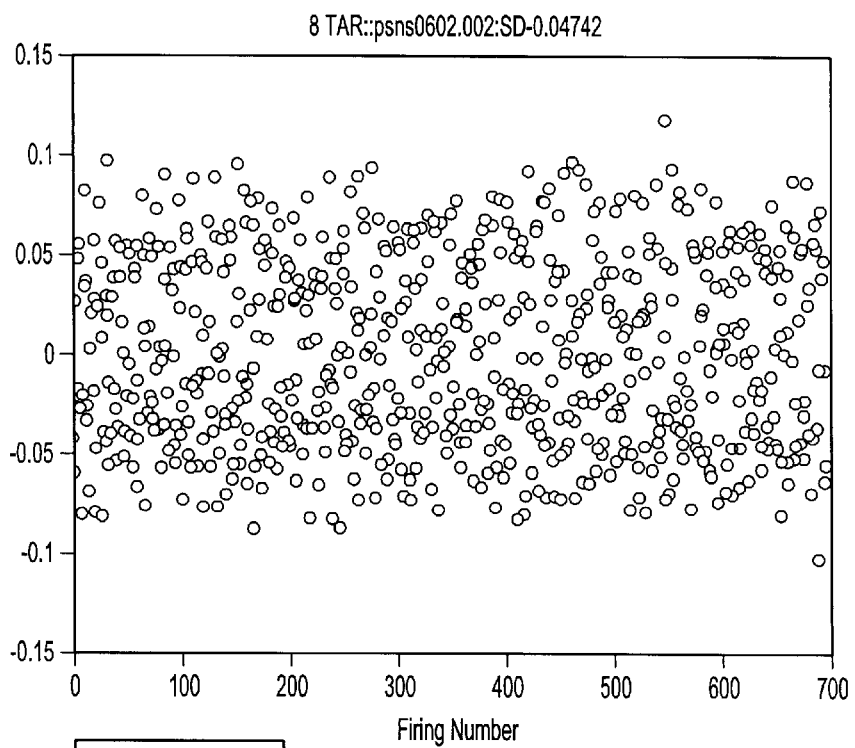
FIG. 30d shows the signature of the misfire detection system output with the compensated RPM input using the compensation vector shown in FIG. 30c.

FIG. 30c plots a compensation vector generated from the test data, shown in FIG. 30a, with the SD criterion and 18 compensation data windows. FIG. 30d shows the signature of the output of the decimation block of the misfire detection system with the compensated RPM input using the compensation vector shown in FIG. 30c. Although no misfires were induced for this test data, FIG. 30 d clearly shows how the compensation vector as determined based upon the standard deviation criterion provides a narrower signature for comparing with misfire events.

Figure 31:
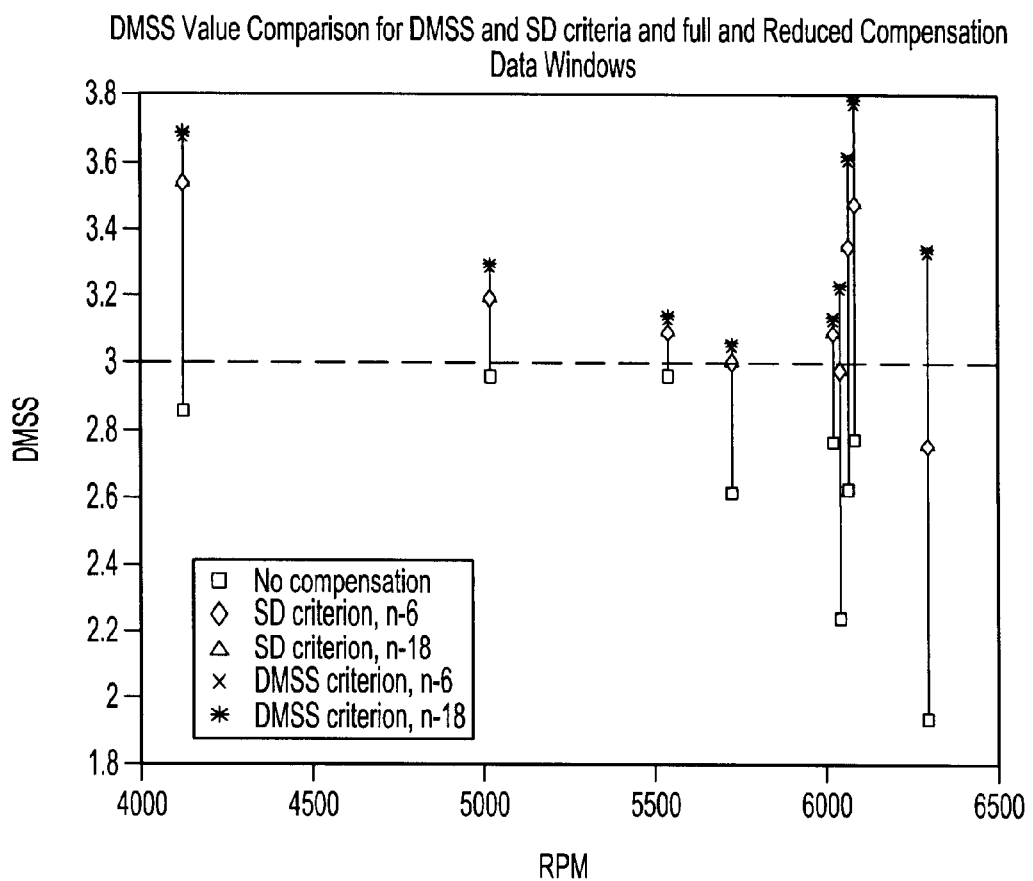
FIG. 31 shows a DMSS value comparison for the DMSS and SD criteria and full and reduced compensation windows. All the evaluation data are from a V6 engine and 100 percent random misfire pattern.

FIG. 31 shows a DMSS value comparison for the DMSS and SD criteria and full and reduced compensation windows. All the evaluation data are from a V6 engine and 100 percent random misfire pattern. The graphical data of FIG. 31 shows that the DMSS criterion and SD criterion provide a higher DMSS value in comparison to the use of no compensation vector. In addition, the use of six carefully selected data windows instead of eighteen only results in slightly lower DMSS values while reducing calculation requirements substantially.

Returning to the block diagram of FIG. 3A, upon performing its function, the signal preprocessing block 74 inputs the pre-processed crankshaft speed and manifold pressure data into a misfire magnitude equalization block 76. The equivalent band pass filtering block 78 subsequently filters the data signal input from the misfire magnitude equalization block 76 before passing the signal to a decimation block 80. The decimation block 80 downsamples data points within the signal and inputs the decimated signal into a resonance removal block 82 that removes resonance noise, such as that caused by powertrain dynamics, from the input signal. The resonance removal block subsequently inputs the signal into a normal firing mean equalization block 84, which further conditions the signal before inputting the signal into a cube-law processing block 86, which enhances separation between signatures of misfire and normal fire signals. After being processed in the cube-law processing block, the signal is fed into a dynamic threshold and decision block 88 which determines from the processed signal whether an engine misfire has occurred for a particular cylinder firing event. The dynamic threshold and decision block 88 subsequently outputs a signal indicating whether an engine misfire or a normal engine fire has occurred for the particular firing event at the misfire indication block 90. In order to provide a more comprehensive understanding of the structure and function of the present invention, each of the above identified processing blocks will be discussed in more detail as follows.

Still referring to FIG. 3A, the sensor and data acquisition block 72 is associated with the crankshaft sensor wheel 32 and crankshaft sensor 38 which, as described above, generate and transmit data relating to the crankshaft angular velocity. In addition, the block 72 is associated with the cam position sensor 40 and the map sensor 42. The sensors and data acquisition block 72 may also be associated with any other data generating devices included in the motor vehicle powertrain for use in generating data related to the present invention.

The signals utilized by the detection method and system of the present invention include engine speed rpm, as measured by the sensor wheel 32, and the manifold absolute pressure (MAP) as measured by the MAP sensor 42. In addition, the cam signal, as measured by the cam position sensor 40, is used for system synchronization and engine cylinder identification as described above. As the sensor wheel rotates with the crankshaft, the tooth edges identified above are sensed and converted to an electrical signal by the crankshaft sensor 38. The timing between the edges of the electrical signal is measured by the controller, and the engine rpm is then calculated via this measured timing interval.

The MAP signal sampling rate is reduced to a rate lower than that of the rpm sampling rate to reduce the system computational requirements. For example, the MAP signal can be sampled at the rate of one data point between individual cylinder firing events, rather than the three data points per firing event described above.

The signal preprocessing block 74 is utilized to extract the desired signal components from the input sensed crankshaft and MAP signals. In particular, the average and fluctuation signal components are extracted from the engine rpm signal N(k) and the average signal components from the manifold absolute pressure signal P(k), respectively, using the digital filters described above and other frequency filtering techniques, such as mean filters, exponential filters and FIR filters. The block may also extract other information, such as cylinder identifications information.

The most important signal components for the misfire detection system of the present invention are the fluctuation components of the rpm signals denoted by $\tilde{N}(k)$, as the fluctuation component inherently contains the engine misfire signature. The rpm and map average components denoted by $\bar{N}(k)$ and $\bar{P}(k)$, respectively, enable the system to compensate for various engine operating conditions. The signal preprocessing block scales all of the above signals to enable the controller to process the signals in the digital domain.

Figure 4:
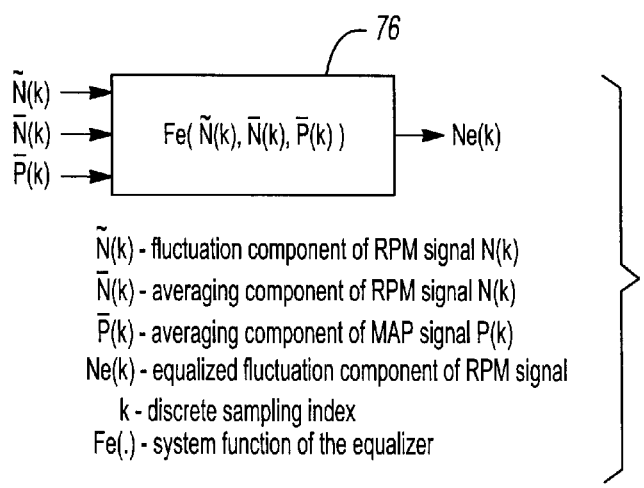
FIG. 4 is a block diagram showing the misfire magnitude equalization block of FIG. 3 in more detail.

The misfire magnitude equalization block 76 compensates for large variations in misfire signature magnitude due to engine operating conditions. Referring to FIG. 4, the block 76 is shown in more detail. The inputs to the equalization block include the engine speed fluctuation signal $\tilde{N}(k)$, the average engine speed component $\bar{N}(k)$, and the average manifold absolute pressure component $\bar{p}(k)$, with (k) being the discrete time index. The block 76 thus processes the signal through the system function $Fe[\tilde{N}(k)\bar{N}(k),\bar{P}(k)]$ of the equalizer, based on the magnitudes on the misfire signature from different engine operating conditions. The output signal from the misfire magnitude equalization block 76, Ne(k) is input into the equivalent band pass filtering block 78.

Referring again to FIG. 3A, the equivalent band pass filtering block 78 subsequently filters the equalized signal Ne(k). Because all the dominant "frequency" components of the misfire signal fall below the engine firing "frequency" for data collected in crankshaft angular domain, the firing frequency and its higher order harmonic components are thus filtered out by the filtering block 78. This block plays an important role in filtering out undesired noise having a frequency beyond the interested misfire signature frequency band to further improve the signal to noise ratio. Preferably, a combination of filters such as FIR filters, mean filters and comb filters is used to effectively remove the undesired noise and efficiently realizes the equivalent band pass firing processing. With this technique, a low order, such as eighth order, FIR filter is utilized and is less expensive to implement. The decimation block 80 is utilized to downsample the data points collected between two firing events. As more than one data point is generated between engine firing events, the decision on whether an engine misfire has occurred will be based on more than one data point. For a data sampling rate with M>1 points per firing, the decimation block maps every M points into one data point to simplify additional misfire detection system processing. Preferably, the decimation block extracts one of the M points between two cylinder firing events based upon criteria, such as the separation performance of normal firing and misfire signatures. Typically, the middle data point of the M points is extracted and further processed. The decimation block 80 is realized between the equivalent band pass filtering block 78 and the resonance removal block 82 to reduce further computational requirements of subsequent processing blocks. However, the decimation block could also be realized just before the dynamic threshold and decision block 88.

The resonance removal block 82 detects and removes resonance noise caused by a vehicle powertrain system when an impulse type noise or signal excites the dynamic system, such as induced oscillation after misfire events and torsional vibration. For instance, a large drop in engine speed caused by misfire excites the powertrain and generates damped speed oscillation. The resonance removal block 82 therefore reduces false detection of engine misfire, especially when transmission is in high gear and engine speed is low. The resonance removal block 82 is implemented using a deconvolution method.

Figure 5:
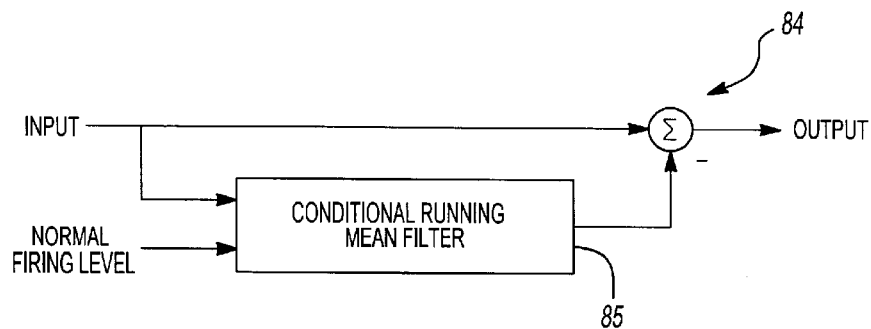
FIG. 5 is a detailed block diagram of the normal firing mean equalization block shown in FIG. 3.

The normal firing mean equalization block 84 compensates for variation in the mean of normal firing sample data points. As shown in more detail in FIG. 5, the block adjusts the signal input from the resonance removal block 82 based on a running mean calculated at a conditional running mean filter 85 from previous normal firing samples. As a result, the signal processed through the normal firing mean equalization block 84 has a zero mean characteristic for normal firing data point samples. In general, the data points representative of normal engine firings may not have values close to their mean level when misfire occurs in some kinds of misfire pattern.

Figure 6:
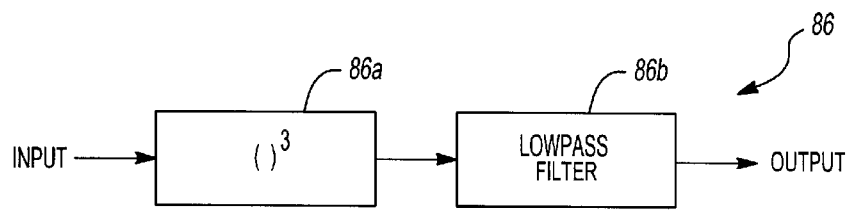
FIG. 6 is a detailed block diagram of the cube law processing block shown in FIG. 3.

After the signal is equalized through the block 84, it is input into the cube law processing block 86. As shown in more detail in FIG. 6, the cube law processing block cubes the input signal through cubing block 86a and then filters the signal through a low pass filter 86b before outputting to the dynamic threshold and decision block 88. The block 86 increases separation between signatures of misfire data points and normal fire data points in the crankshaft velocity signal, and is effective when the signal input into the block has a relatively high signal to noise ratio. The low pass filter in the block is preferably realized through programming of the controller, and although it may not be necessary for certain signal processing, it is preferably used to filter high order harmonics generated by the cube operation of the system, along with undesired noise.

Figure 7:
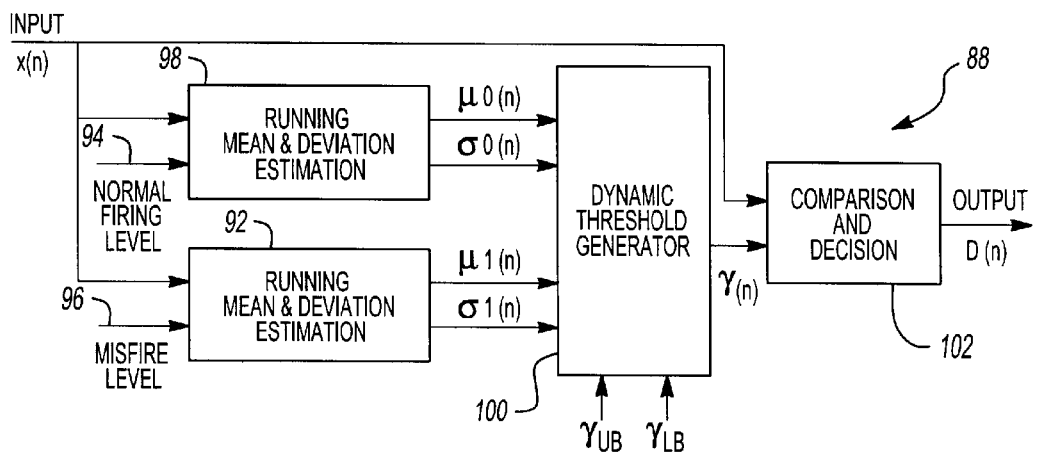
FIG. 7 is a detailed block diagram of the dynamic threshold and decision block shown in FIG. 3.

The dynamic threshold and decision block 88 is shown in more detail in FIG. 7. The block 88 estimates normal and misfire signature statistical information and generates a dynamic threshold for misfire detection decision making purposes. The input signal x(n) is input from the cube law processing block 86 to running mean and deviation estimator 98, 92. The running mean and deviation estimator 98 also includes a normal firing level signal input 94, while the running mean and deviation estimator 92 includes a misfire level signal input 96. The estimator 98 has the input signal from inputs x(n) and outputs an estimate of the mean and deviation of the normal firing signature $\mu_0(n)$ and $\sigma_0(n)$ while the filter 92 outputs an estimate of the mean and deviation of the misfire signature $\mu_1(n)$ and $\sigma_1(n)$.

Figure 8:
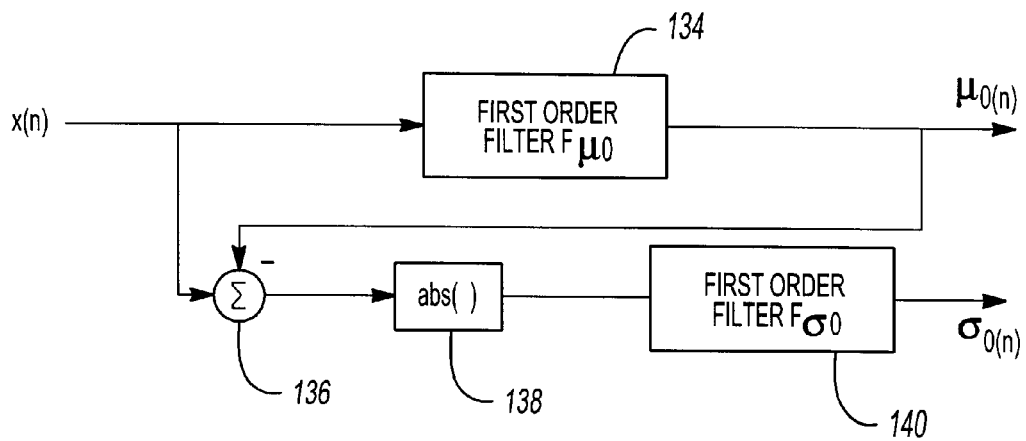
FIG. 8 is a block diagram showing a running mean and deviation estimator for normal firing signal of FIG. 7 in more detail.
Figure 9:
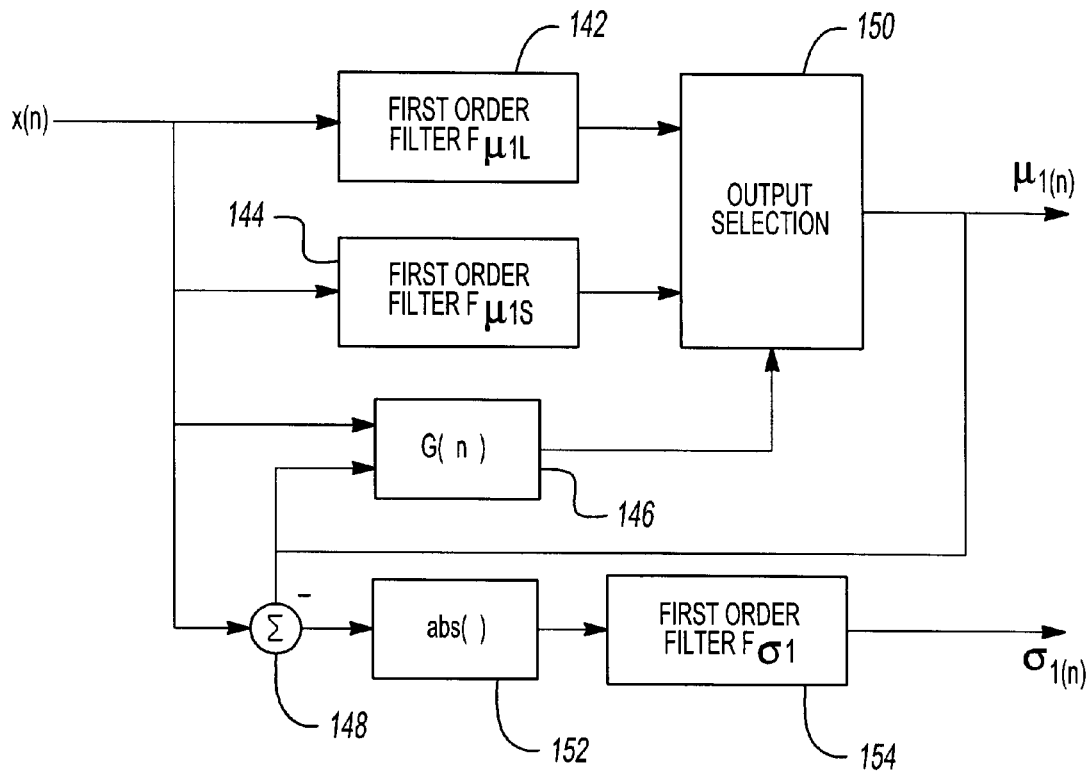
FIG. 9 is a block diagram showing a running mean and deviation estimator for misfire signal of FIG. 7 in more detail.

More particularly, referring to FIG. 8, the running mean and deviation estimator 98 is shown in more detail. The input signal x(n) is input into a first order filter 134 to generate an estimate of the mean of normal firing signal. After the input signal x(n) is subtracted, the estimated mean at the block 136, it is input into the absoluting block 138 where it is maintained or converted, if necessary, to a positive value. From the absoluting block 138, the input signal x(n) is input into a first order filter 140 to generate an estimate of the deviation of normal firing signal. The first order filters 134 and 140 can be written into the general difference equation:

$$y(n)=h_1y(n-1)+h_0u(n); \tag{1}$$

where u(n) is the input of the filter and $h_0$ and $h_1$ are the filter coefficients. Note that the running mean and deviation estimator 98 operates conditionally based on the normal firing level 94. That is, the mean and deviation estimates are updated only when the input signal x(n) is above the normal firing level. Referring now to FIG. 9, the running mean and deviation estimator 92 is shown in more detail. The input signal x(u) is input into a first order filter 142, another first order filter 144, and a comparator block 146.

After the input signal x(u) is filtered at the first order filters 142 and 144, it is input into an output selection block 150 where the output G(n) from the comparator block 146 is used to decide which output from the two filters 142 and 144 will be used for the running mean estimate $\mu_1(n)$. The output of the out put selection block 150 is then subtracted by the input signal x(n) at the summation block 148 for use in determinations of deviation of misfire signal.

The output signal of the summation block 148 is then input into an absoluting block 152 where it is maintained or converted, if necessary, to a positive value. From the absoluting block 152 the signal is input into a first order filter 154 to generate an estimate of the deviation of misfire signal. The first order filters 142, 144 and 154 can be written as equation (1) above. Preferably, the first order filters 142 and 144 are running mean estimation filters with different parameters to satisfy the requirement for the different time responses in the running mean estimation $\mu_1(n)$ while the output of the first order filter 154 gives an absolute deviation estimate for deviation $°1^{(n)}$. It is also noted that the mean and deviation estimator 92 operates conditionally based on the misfire level 96. That is, the mean and deviation estimates are updated only when the input signal x(n) is below the misfire level.

Referring again to FIG. 7, the block 88 also includes a dynamic threshold generator 100, which updates the dynamic threshold $\gamma$ at discrete time interval n based on the mean and deviation estimates for both the normal and misfire signature signals. Preferably, the threshold is defined between upper and lower boundaries $\gamma_{UB}(n)$ and $\gamma_{LB}(n)$. The dynamic threshold generator outputs the dynamic threshold value to a comparison and decision block 102, which also has as an input the input signal x(n). The comparison and decision block 102 determines if the input x(n) is less than $\gamma(n)$. If so, the comparison and decision block outputs a "one" for misfire, or a "zero" for normal firing if x(n) is greater than or equal to $\gamma(n)$. It should also be known that the output D(n) from comparison and decision block 102 may be fed back to the running mean and deviation estimator 92 as part of the misfire level input 96 (see FIG. 7).

Figure 11:
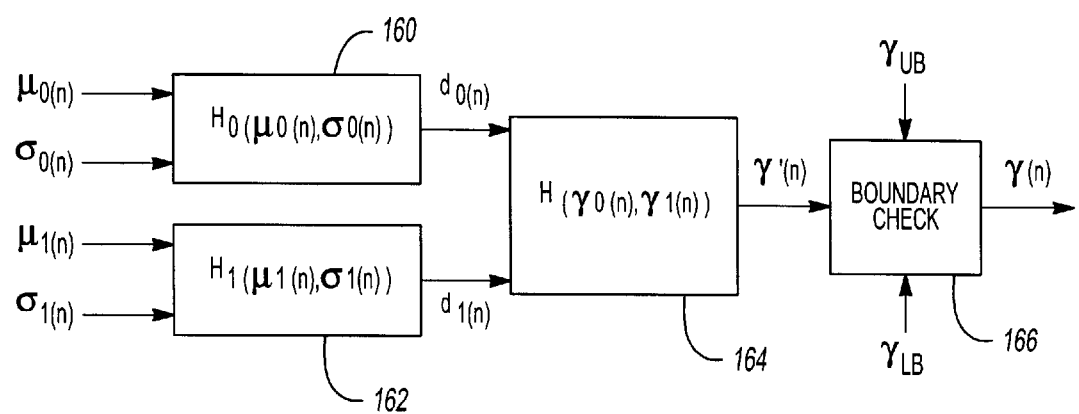
FIG. 11 is a block diagram showing the dynamic threshold generator of FIG. 7 in more detail.
Figure 12A:
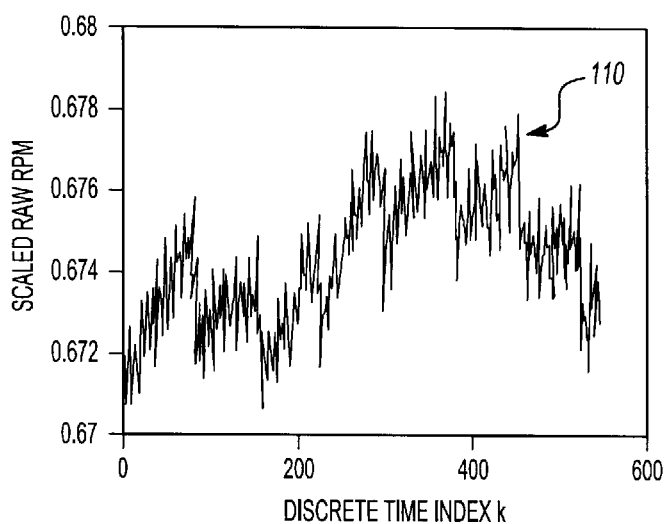
FIGS. 12A–12D are graphs illustrating the effects of the signal preprocessing block shown in FIG. 3 on the sensed crankshaft signal and MAP signal for a first set of engine operation condition and misfire pattern.
Figure 12B:
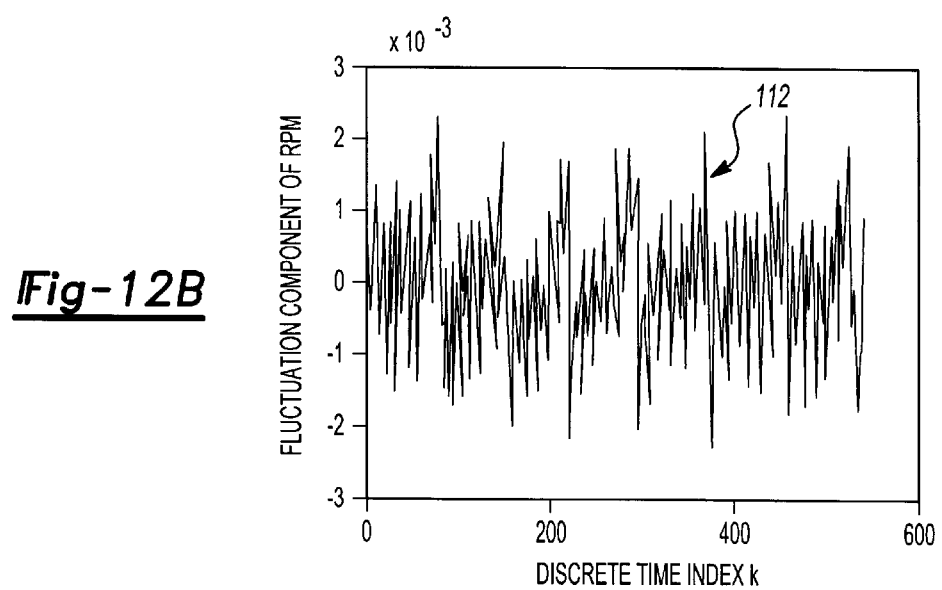
Figure 12C:
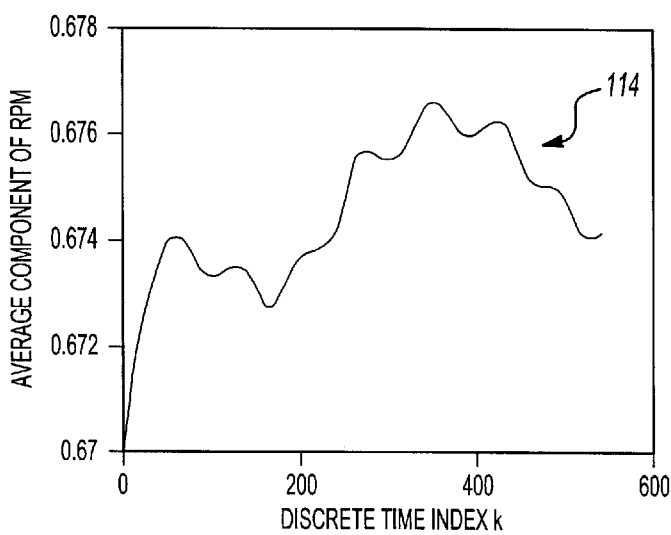
Figure 12D:
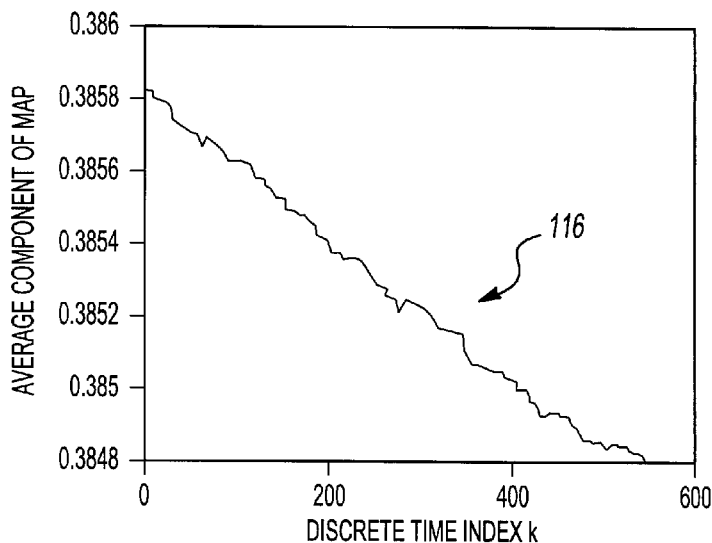
Figure 13:
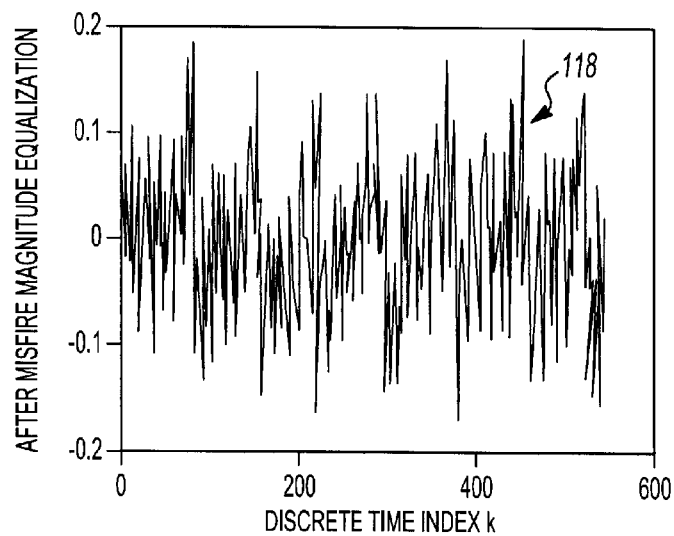
FIG. 13 is a graph illustrating the effects of the misfire magnitude equalization block shown in FIG. 3 on the sensed crankshaft signal.

Turning now to FIGS. 10 and 11, the dynamic threshold generator 100 will be described in greater detail. Engine misfire detection is a binary decision problem that decides whether a misfire has occurred or not. If a signal for the decision has perfect separation between the values representing misfire and normal firing, for example, all the values representing misfire are "1" and all the values representing normal firing are "0", then the decision becomes very easy and a fixed threshold which has a value between "0" and "1" can be chosen. In practice however, the signal is not so perfect. The values representing misfire and normal firing are spread into two groups usually clustered together with a probability distribution as illustrated in FIG. 10. The probability density functions $f_0(x)$ and $f_1(x)$ shown in FIG. 10 correspond to the normal firing 156 and misfire 158, respectively. In general, the probability density functions are difficult to know but their statistical parameters can be estimated with a current normal or misfire value and its previous values at time steps.

The threshold determination is made by first calculating the running mean $\mu_x(n)$ and deviation $\sigma_x(n)$ for two signatures (the "statistical parameters"), based on the current and previous data of the signal, as discussed above, where x denotes 0 or 1. Secondly, two deviation ranges do from $d_0$ from $\mu_0$ and $d_1$ from $\mu_1$, as illustrated in FIG. 10 are calculated as follows:

$$d_0(n)=H_0(\mu_0(n),\sigma_0(n))=\mu_0(n)-N_0(\sigma_0)\sigma_0(n)$$

$$d_1(n)=H_1(\mu_1(n),\sigma_1(n))=\mu_1(n)+N_1(\sigma_1)\sigma_1(n) \quad (2)$$

where $N_0(\sigma_0(n))$ and $N_1(\sigma_1(n))$ are determined with a predetermined criterion or from calibration data. For simplicity in a real implementation, $N_0(\sigma_0(n))$ and $N_1(\sigma_1(n))$ are usually chosen to be two constant values. Finally, the threshold $\gamma$ is chosen between $d_0$ and $d_1$ as shown below:

$$\gamma(n)=H(d_0(n),d_1(n))=\alpha d_1(n)+(1-\alpha)d_0(n)$$

where $\alpha$ is determined with a predetermined criterion or from calibration data. As such, the threshold $\gamma$ is updated at each time step. It should be noted that if the probability density functions $f_0(x)$ and $f_1(x)$ are known, it is possible to derive a threshold directly from $\mu_0(n)$, $\sigma_0(n)$, $\mu_1(n)$ and $\sigma_1(n)$ using an optimal decision rule according to known criterion.

FIG. 11 illustrates a block diagram of the dynamic threshold generator 100 described above. The outputs $\mu_0(n)$ and $\sigma_0(n)$ from the running mean and deviation filter 98 are input into block 160 while the outputs $\mu_0(n)$ and $\sigma_0(n)$ from the running mean and deviation filter 92 are input into block 162. The blocks 160 and 162 determine the deviation ranges $d_0(n)$ and $d_1(n)$ according to equations (2) above. The ranges $d_0(n)$ and $d_1(n)$ from blocks 160 and 162 are input into threshold generator 164 where equation (3) above is performed. After the threshold $\gamma(n)$ is determined at threshold generator 164, it is input into boundary check block 166 (i.e., threshold limiter) to ensure that the threshold $\gamma(n)$ is between upper and lower boundaries $\gamma_{UB}(n)$ and $\gamma_{LB}(n)$. The output $\gamma(n)$ is input into the comparison and decision block 102 for determining if the input x(n) is less than $\gamma(n)$ or not as described above.

Referring to FIGS. 12 to 19, the effect that each of the blocks shown in FIG. 3A has on crankshaft signal processing is graphically illustrated for a 16% random misfire mode with 5500 RPM and 300 Torr of MAP. Referring first to FIGS. 12A to 12D, the scaled raw engine RPM signal is shown subsequent to being processed by the signal preprocessing block 74, in FIG. 12A at 110. In the misfire magnitude equalization block 76, the RPM signal is separated into its fluctuation component $\tilde{N}(k)$, as shown in FIG. 12B at 112, and its average RPM component $\bar{N}(k)$, as shown at 114 in FIG. 12. Also, the average map component is extracted by the block, as shown at 116 in FIG. 12D. These separate components of the signals are processed in the misfire magnitude equalization block, and the output signal Ne(k) is shown at 118 in FIG. 13.

Figure 14:
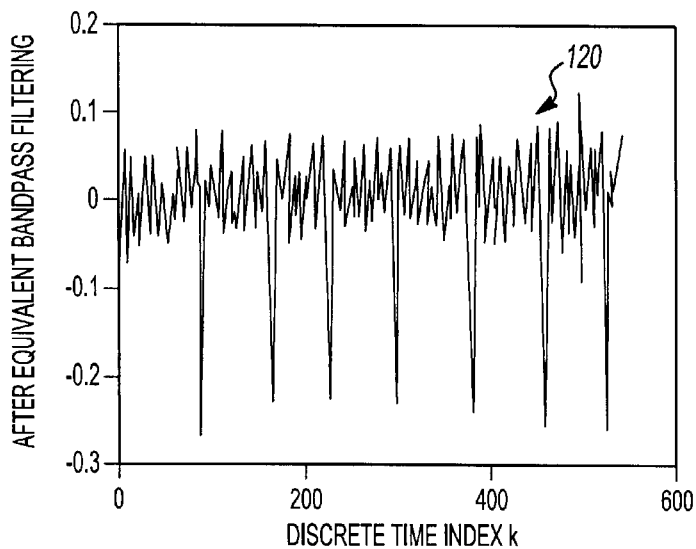
FIG. 14 is a graph illustrating the effects of the bandpass filtering block shown in FIG. 3 on the sensed crankshaft signal.
Figure 15:
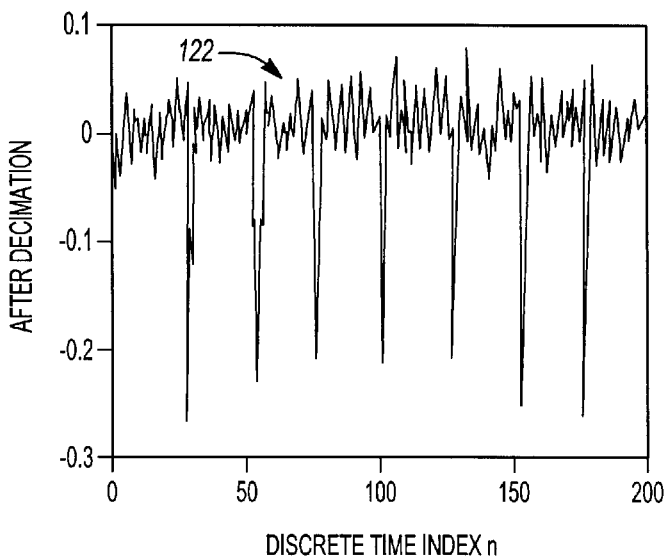
FIG. 15 is a graph illustrating the effects of the decimation block shown in FIG. 3 on the sensed crankshaft signal.
Figure 16:
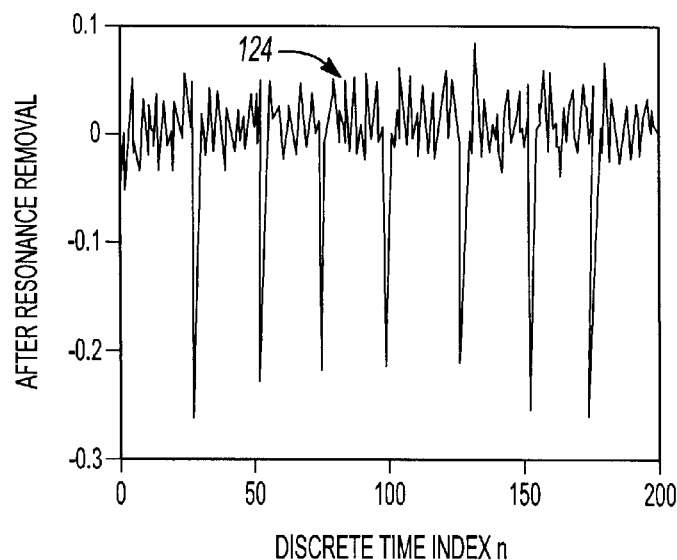
FIG. 16 is a graph illustrating the effects of the resonance removal block shown in FIG. 3 on the sensed crankshaft signal.
Figure 17:
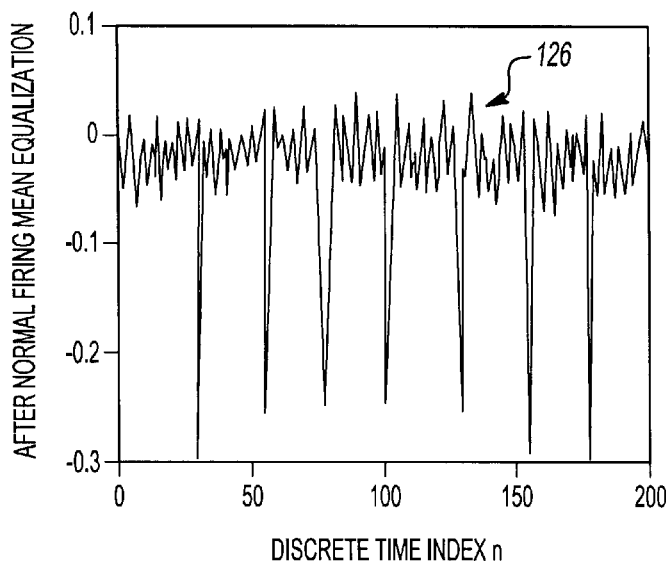
FIG. 17 is a graph illustrating the effects of the normal firing mean equalization block shown in FIG. 3 on the sensed crankshaft signal.
Figure 18:
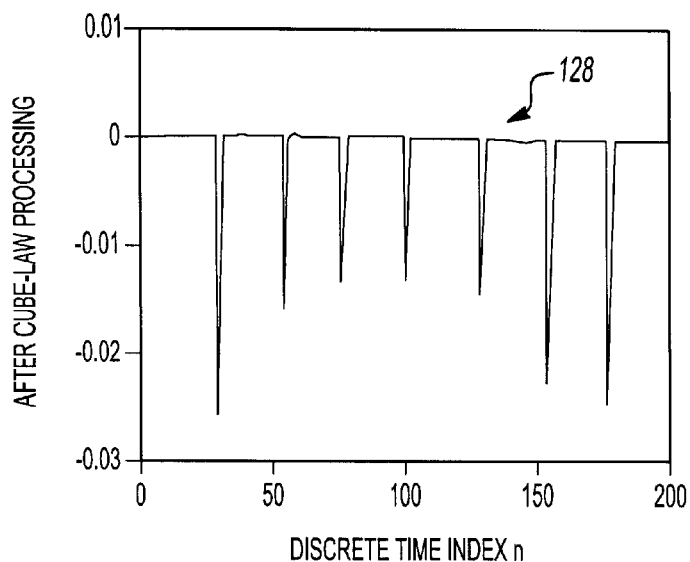
FIG. 18 is a graph illustrating the effects of the cube-law processing block shown in FIG. 3 on the sensed crankshaft signal.
Figure 19:
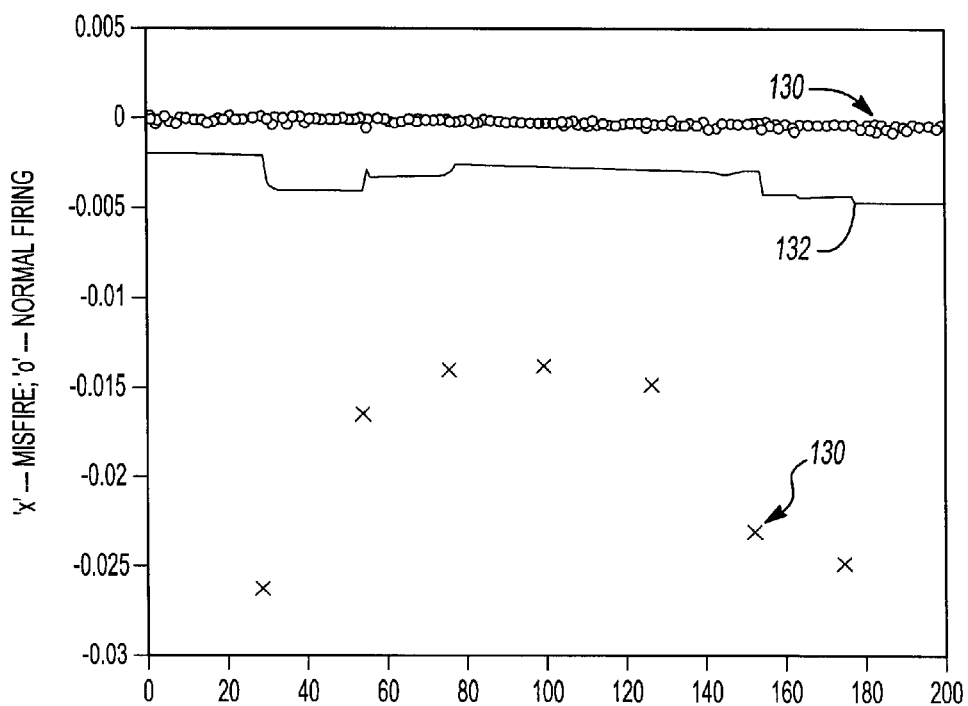
FIG. 19 is a graph illustrating the processed normal firing and misfire data points together with the dynamic threshold generated from the dynamic threshold and decision block shown in FIG. 3 for determining the occurrence of engine misfire.
Figure 20A:
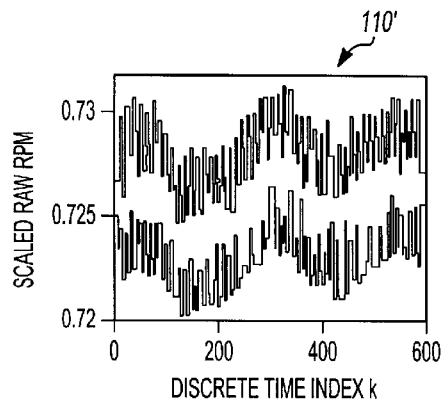
FIGS. 20–27 are graphs corresponding to FIGS. 8–15, respectively, for a second set of engine operation condition and misfire pattern.
Figure 20B:
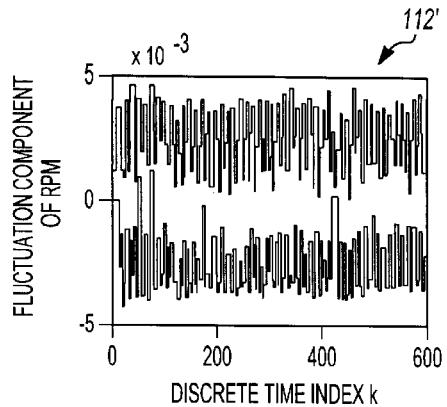
Figure 20C:
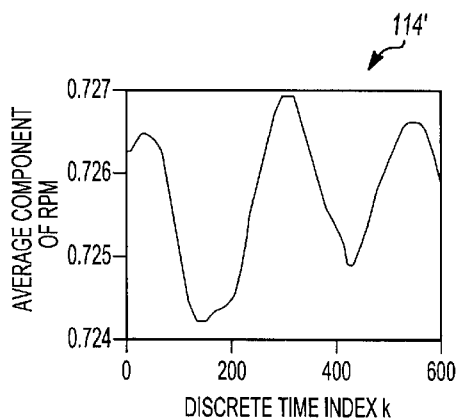
Figure 20D:
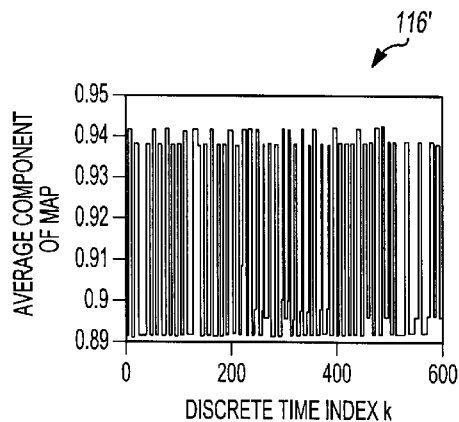
Figure 21:
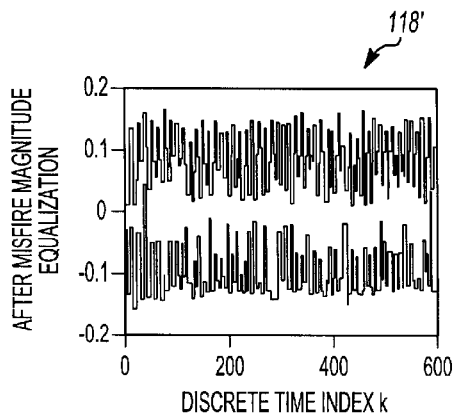
Figure 22:
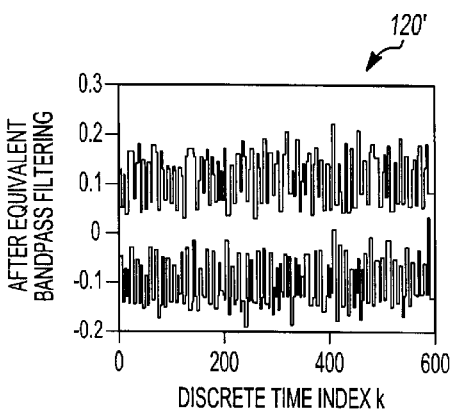
Figure 23:
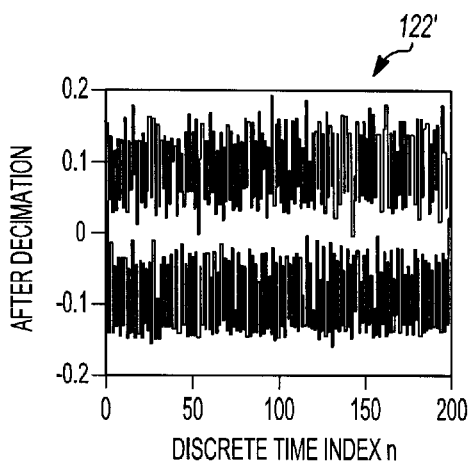
Figure 24:
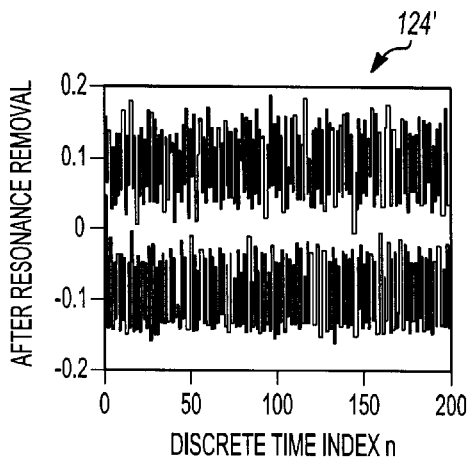
Figure 25:
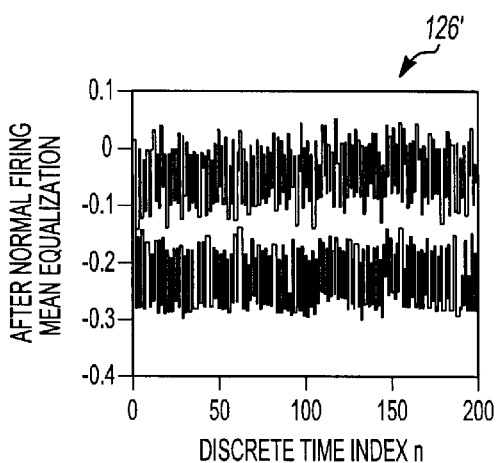
Figure 26:
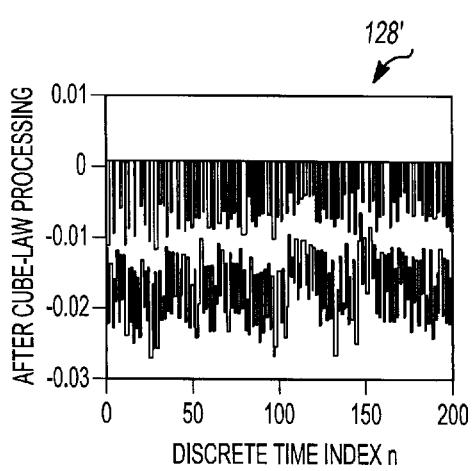
Figure 27:
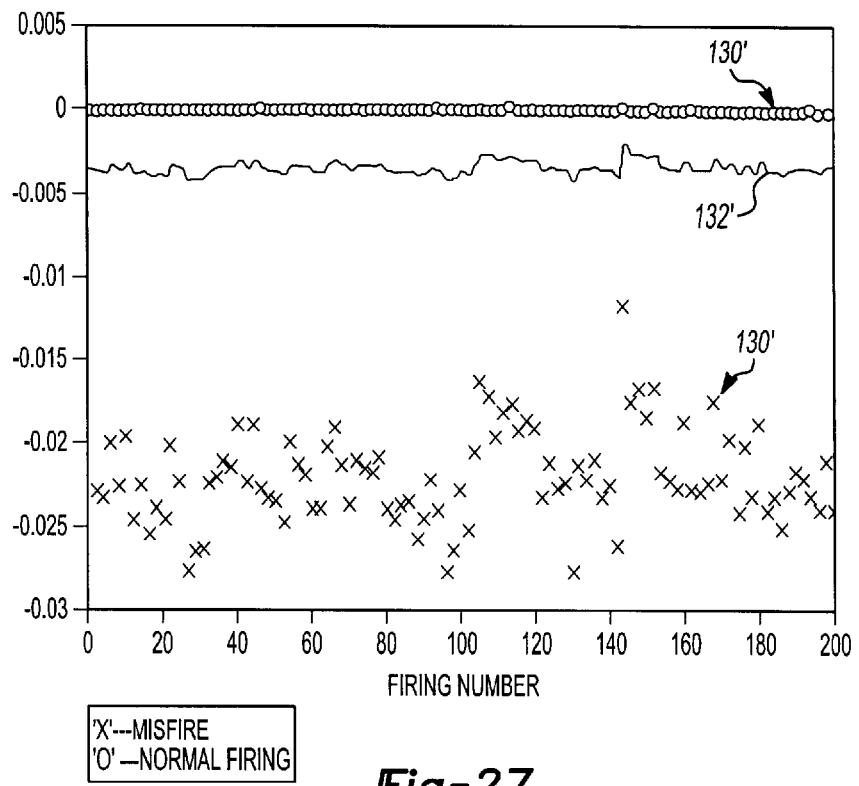

The signal Ne(k) is then input into the equivalent band pass filtering block 78 and, after being filtered, the signal shown at 120 in FIG. 14 is provided. This filtered signal is then input into the decimation block 80 where the data points in the signal are downsampled, as shown at 122 in FIG. 15. The decimated signal is then input into the resonance removal block 82, where resonance noise is removed from the signal, resulting in the signal shown at 124 in FIG. 16. The signal is then equalized by the normal firing mean equalization block 84, as shown at 126 in FIG. 17, before being cubed and filtered by the cube law processing block 86, resulting in the cubed signal shown at 128 in FIG. 18. The cubed and filtered signal is output from the block 86 and into the dynamic threshold and decision block 88. The signal input into the block 88 is represented graphically with data points "X" or "O" at 130, where "X" indicates misfire in FIG. 19, and "O" indicates normal fire. The dynamic threshold at 132 is used in the decision block 88 to determine whether or not an engine misfire has occurred, and the decision results are transmitted to the misfire indication block 90.

Referring now to FIGS. 20 to 27, the effect each of the blocks shown in FIG. 3A has on crankshaft signal processing is graphically illustrated for a multiple cylinder #1 and #4 100% continuous misfire mode at 6000 RPM and 720 Torr of MAP for four cylinder engine misfire detection. The graphed results shown at 110' to 132' in FIGS. 20 to 27 correspond to the graphed results shown at 110 to 132 in FIGS. 12 to 19 and the above description of the methodology described in connection with FIGS. 8–15.

As should be appreciated from the foregoing description, the medium data rate misfire detection system of the present invention represents a highly accurate technique of detecting engine misfire. The system of the present invention, while being highly accurate, minimizes the computational complexity associated with detecting engine misfire, and thus minimizes the cost of realizing the system. The system is thus capable of being installed on a large scale basis in motor vehicles through use of existing on board automotive micro controller technology.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of detecting misfire in an internal combustion engine comprising the steps of:
    generating a data signal containing a plurality of groups of sampled data points, each of said plurality of groups of sampled data points representing a sampled crankshaft angular velocity for a particular cylinder firing event;
    selecting a crankshaft angular velocity zone from said sampled data points;
    generating compensation parameters for the selected crankshaft angular velocity zone;
    multiplying the compensation parameters by the sampled data points;
    generating a single mapped data point for each of said plurality of groups of sampled data points;
    generating a misfire detection dynamic threshold;
    determining if a value of said single mapped data point falls below or above said dynamic threshold for each of said plurality of groups of sampled data points; and
    outputting a misfire detection signal if said value of said single mapped data point falls below said dynamic threshold for each of said plurality of groups of sampled data points.

2. The method according to claim 1, wherein said compensation parameters are determined based upon stored values downloaded into a control system of the internal combustion engine.

3. The method according to claim 2, wherein said stored values are determined based upon an optimal search algorithm.

4. The method according to claim 3, wherein said optimal search algorithm is based upon a difference of a mean divided by a sum of a standard deviation statistical criterion.

5. The method according to claim 3, wherein said optimal search algorithm is based upon a standard deviation statistical criterion.

* * * * *

UNITED STATES PATENT AND TRADEMARK OFFICE
CERTIFICATE OF CORRECTION

PATENT NO. : 6,314,802 B1
DATED : November 13, 2001
INVENTOR(S) : Wu et al.

It is certified that error appears in the above-identified patent and that said Letters Patent is hereby corrected as shown below:

Column 9,
Line 8, ")T" should read -- $\Delta T$ --;
Line 11, ")2" should read -- $\Delta \Theta$ --;
Line 13, ")T" should read -- $\Delta T$ --;
Line 21, "$T_m$=T+)T" should read -- $T_m=T+\Delta T$ --;
Line 22, ")2" should read -- $\Delta \Theta$ --;
Line 23, "parameter 0" should read -- parameter $\eta$ --;
Line 25 "parameters 0" should read -- parameters $\eta$ --;
Line 27, "0=[$0_1$, $0_2$,...,$0_n$]" should read -- $\eta_1, \eta_2,...\eta_n$] --;
Line 51, "vectors 0" should read -- vectors $\eta$ --;
Line 52, "vectors 0" should read -- vectors $\eta$ --;
Line 54, "parameter 0" should read -- parameter $\eta$ --;
Line 56, "vectors 0" should read -- vectors $\eta$ --;
Line 64, "parameters 0" should read -- parameters $\eta$ --;

Column 10,
Line 23, "0=[$0_1$, $0_2$,...,$0_n$]" should read -- $\eta_1, \eta_2,...\eta_n$] --;
Line 33, ":$_o$ and $\Phi_o$" should read -- $\mu_0$ and $\sigma_0$ --;
Line 34, ":$_1$ and $\Phi_1$" should read -- and $\mu_1$ and $\sigma_1$ --;
Line 43, "vector 0" should read -- vector $\eta$ --;
Line 48, "where $\Phi_o$" should read -- $\sigma_0$- --.

Signed and Sealed this

Seventh Day of May, 2002

Attest:

JAMES E. ROGAN
*Attesting Officer*     *Director of the United States Patent and Trademark Office*